United States Patent
Harada et al.

(10) Patent No.: US 10,707,523 B2
(45) Date of Patent: Jul. 7, 2020

(54) SOLID ELECTROLYTE, LITHIUM BATTERY, BATTERY PACK, AND VEHICLE

(71) Applicant: Kabushiki Kaisha Toshiba, Minato-ku (JP)

(72) Inventors: Yasuhiro Harada, Isehara (JP); Tomoe Kusama, Kawasaki (JP); Norio Takami, Yokohama (JP); Kazuomi Yoshima, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 105 days.

(21) Appl. No.: 15/455,346

(22) Filed: Mar. 10, 2017

(65) Prior Publication Data

US 2018/0083314 A1    Mar. 22, 2018

(30) Foreign Application Priority Data

Sep. 20, 2016    (JP) .................................. 2016-183097

(51) Int. Cl.
*H01M 10/0562* (2010.01)
*H01M 10/0525* (2010.01)
*H01M 4/485* (2010.01)
*C01B 25/45* (2006.01)

(52) U.S. Cl.
CPC ......... *H01M 10/0562* (2013.01); *C01B 25/45* (2013.01); *H01M 10/0525* (2013.01); *C01P 2002/76* (2013.01); *C01P 2002/77* (2013.01); *H01M 4/485* (2013.01); *H01M 2220/20* (2013.01); *H01M 2300/0068* (2013.01); *H01M 2300/0091* (2013.01); *Y02E 60/122* (2013.01); *Y02T 10/7011* (2013.01)

(58) Field of Classification Search
CPC .................................................. H01M 10/0562
See application file for complete search history.

(56) References Cited

U.S. PATENT DOCUMENTS

| 4,009,092 A | 2/1977 | Taylor | |
|---|---|---|---|
| 2011/0045328 A1* | 2/2011 | Inagaki | H01M 4/485 429/90 |
| 2011/0200874 A1* | 8/2011 | Ono | H01M 4/134 429/213 |

(Continued)

FOREIGN PATENT DOCUMENTS

| EP | 2784858 A2 * | 10/2014 | ............ H01M 4/485 |
|---|---|---|---|
| JP | 2001-143754 A | 5/2001 | |

(Continued)

OTHER PUBLICATIONS

Translation of JP2015065022A (Year: 2018).*

(Continued)

*Primary Examiner* — Brian R Ohara
(74) *Attorney, Agent, or Firm* — Oblon, McClelland, Maier & Neustadt, L.L.P.

(57) ABSTRACT

According to one embodiment, there is provided a solid electrolyte including an oxide represented by General Formula $Li_{1+2x}M1_{2-x}(Ca_{1-y}M2_y)_x(PO_4)_3$. In the General Formula above, M1 is at least one selected from the group consisting of Zr and Hf. M2 is at least one selected from the group consisting of Sr and Ba. x satisfies $0<x<2$. y satisfies $0<y\leq 1$.

14 Claims, 7 Drawing Sheets

(56) References Cited

U.S. PATENT DOCUMENTS

| | | | |
|---|---|---|---|
| 2012/0141849 A1* | 6/2012 | Lin | H01M 2/0217 |
| | | | 429/94 |
| 2012/0328930 A1* | 12/2012 | Inagaki | H01M 4/485 |
| | | | 429/163 |
| 2013/0149592 A1 | 6/2013 | Hayashi et al. | |
| 2013/0260257 A1 | 10/2013 | Choi | |
| 2014/0080006 A1 | 3/2014 | Ogasa | |
| 2014/0166929 A1* | 6/2014 | Takeuchi | H01M 4/625 |
| | | | 252/182.1 |
| 2014/0295289 A1* | 10/2014 | Takami | H01M 4/485 |
| | | | 429/332 |
| 2015/0228970 A1 | 8/2015 | Song et al. | |
| 2017/0250440 A1* | 8/2017 | Nemori | H01M 10/0562 |

FOREIGN PATENT DOCUMENTS

| | | | | |
|---|---|---|---|---|
| JP | 2008-243736 A | 10/2008 | | |
| JP | 2010-205739 A | 9/2010 | | |
| JP | 2013-214494 | 10/2013 | | |
| JP | 2014-60084 | 4/2014 | | |
| JP | 2014-209430 A | 11/2014 | | |
| JP | 5644858 | 12/2014 | | |
| JP | 2015-65022 | 4/2015 | | |
| JP | 2015065022 A | * 4/2015 | ........ | H01M 10/0562 |
| JP | 2016-146338 A | 8/2016 | | |
| WO | WO 2012/020700 A1 | 2/2012 | | |
| WO | WO 2015/140934 A1 | 9/2015 | | |
| WO | WO 2016/121947 A1 | 8/2016 | | |

OTHER PUBLICATIONS

Extended European Search Report dated Jun. 14, 2017 in European Patent Application No. 17159335.3.

T. Savitha, et al., "structural and ionic transport properties of $Li_2AlZr[PO_4]_3$," Journal of Power Sources, vol. 157 No. 1. XP025084065, Nov. 17, 2005, pp. 533-536.

Jean-Noel Chotard et al, "Discovery of a sodium-Ordered form of $Na_3V_2(PO_4)_3$ below ambient temperature", Chemistry of Materials, 2015, 6 pages.

Hui Xie et al. " Nasicon-type $Li_{1-2x}Zr_{2-x}Ca_x(PO_4)_3$ with high ionic conductivity at room temperature", RSC Advances 2011, 4 pages.

Izumi Nakai et al. "Funmatsu X Sen Kaiseki no Jissai", Reality of Powder X-ray Analysis, Asakura Publishing Co., Ltd. 7 pages ( With English Translation).

* cited by examiner

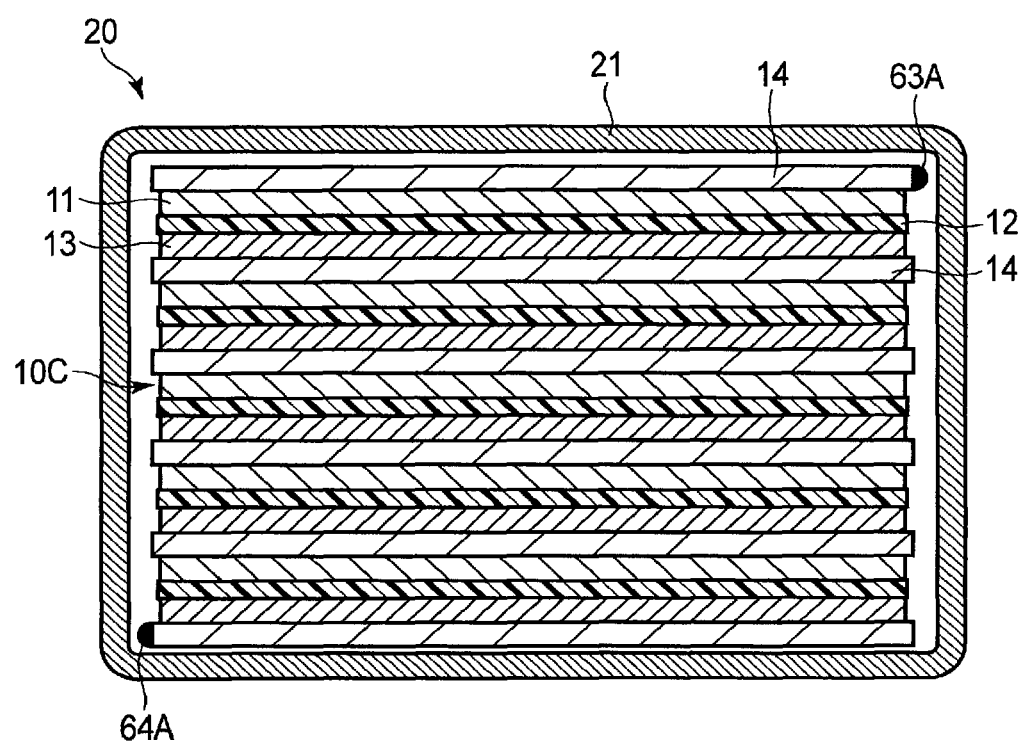
F I G. 4

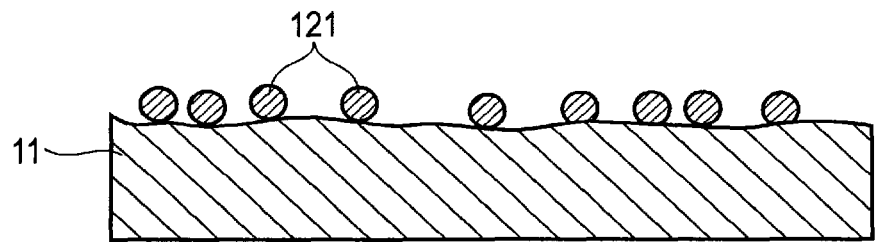
F I G. 5
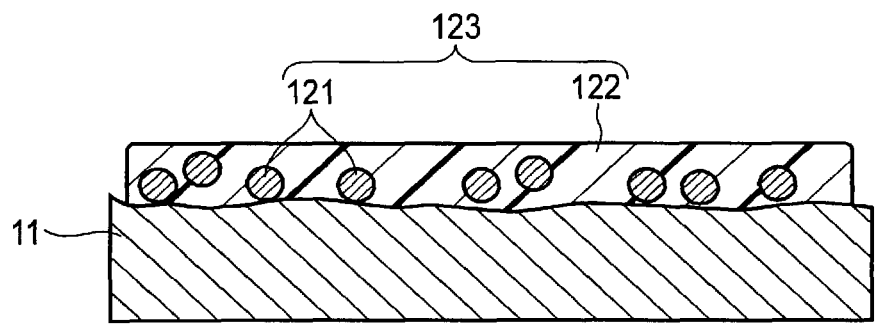
F I G. 6
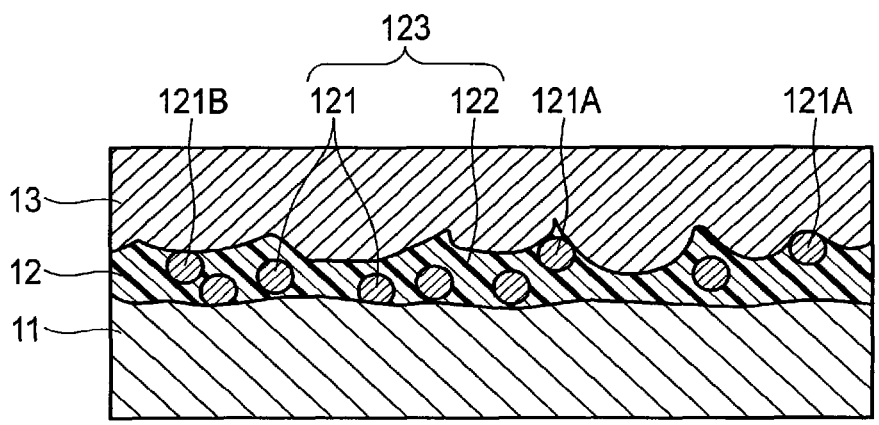
F I G. 7

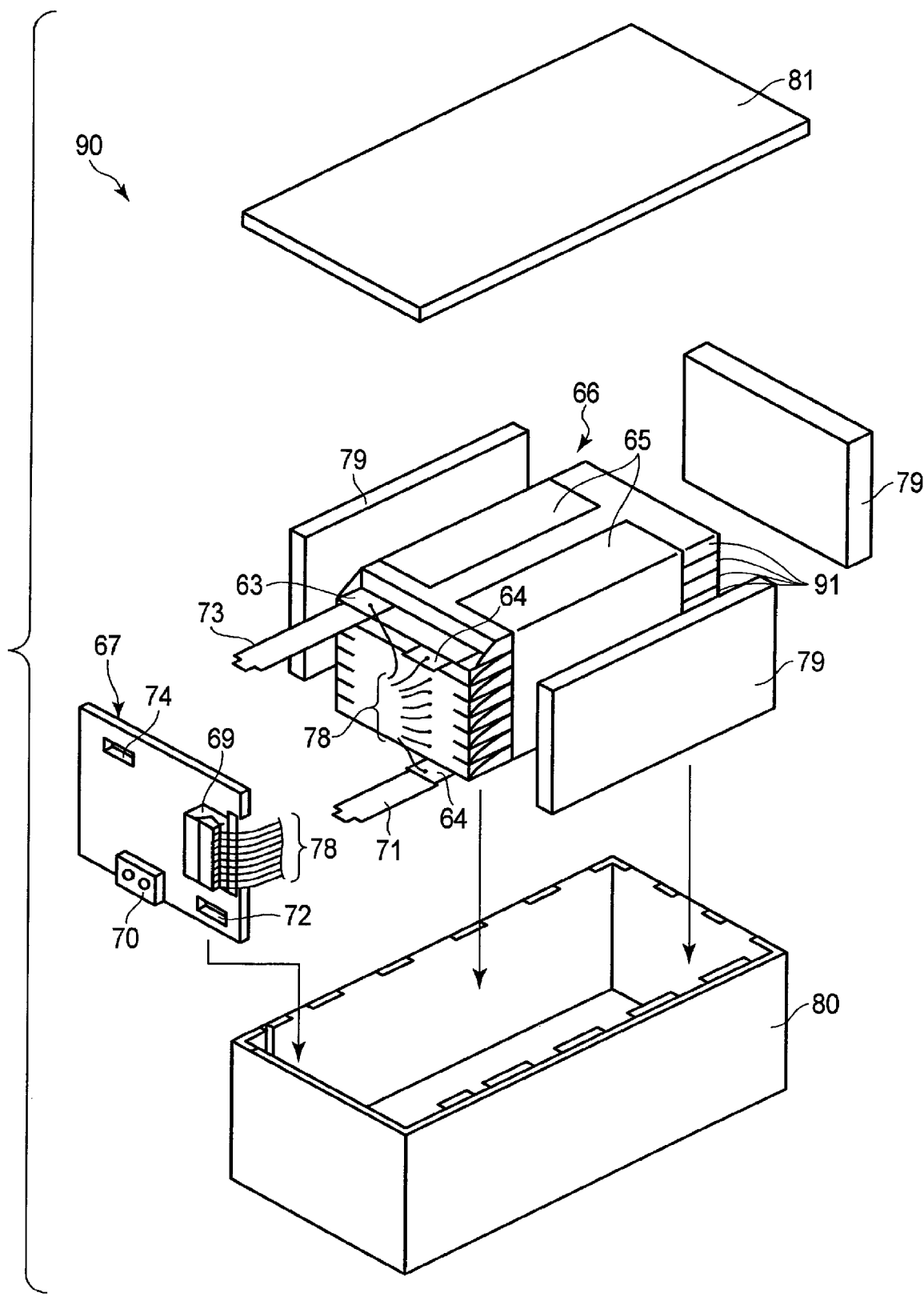
F I G. 8

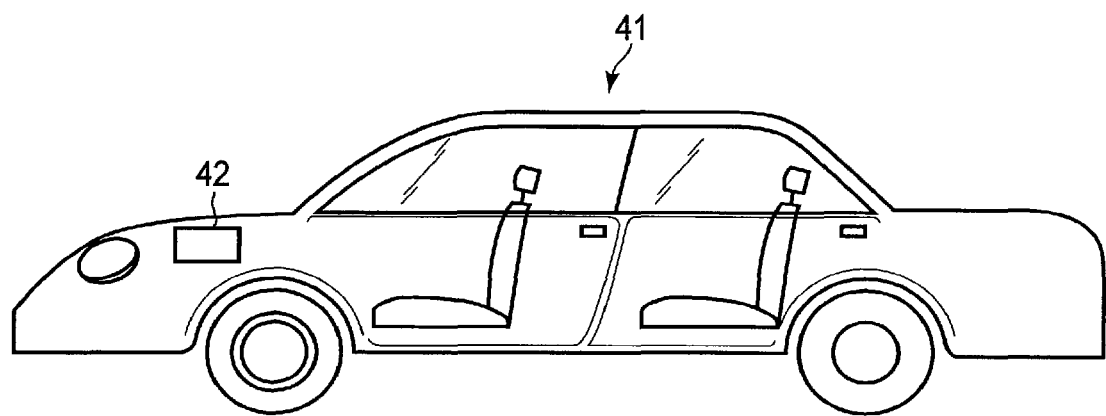
F I G. 10

SOLID ELECTROLYTE, LITHIUM BATTERY, BATTERY PACK, AND VEHICLE

CROSS-REFERENCE TO RELATED APPLICATION

This application is based upon and claims the benefit of priority from Japanese Patent Application No. 2016-183097, filed Sep. 20, 2016; the entire contents of which is incorporated herein by reference.

FIELD

Embodiments relate to a solid electrolyte, a lithium battery, a battery pack, and a vehicle.

BACKGROUND

In recent years, lithium ion secondary batteries with high energy density have received great attention for use in small electronic devices, hybrid cars, electric vehicles, and stationary power sources for power storage. Among them, a lithium ion secondary battery using an inorganic solid electrolyte is expected to be a safe battery since there is no concern for liquid leakage of an organic electrolytic solution or gas generation. In addition, as compared to batteries using liquid electrolyte, the lithium battery using the solid electrolyte has a low possibility of side reactions other than battery reactions, and thus, long life span of the battery can be expected. Further, in all solid battery using an inorganic solid electrolyte, it is easy to stack an electrode and an electrolyte to configure the battery, thereby reducing manufacturing cost. At the same time, when the inorganic solid electrolyte is used, a bipolar type battery is able to be configured. As a result, it is possible to expect a higher energy density as compared to conventional batteries using liquid electrolyte. However, in a lithium ion battery with particularly high electromotive force, a positive electrode is a material having a high oxidizing power and a negative electrode is a material having a high reducing power. Therefore, these materials are required to be stable even if the materials and the solid electrolyte are closely adhered. Further, inexpensive constituent elements become an important factor in view of practicality.

In recent years, a lithium lanthanum zirconate based compound capable of being easily obtained by a solid-state reaction in air and having high lithium ion conductivity has received attention. A representative example of this material includes $Li_7La_3Zr_2O_{12}$. This compound is known to exhibit a high lithium ion conductivity of $5 \times 10^{-4}$ S/cm or more which is the top class in an oxide solid electrolyte, at room temperature. In addition, this compound is characterized by excellent electrochemical stability as compared to that of conventional solid electrolytes. On the other hand, since lanthanum, which is a rare earth element, is included in constituent elements of this compound, it is difficult to produce this compound stably and inexpensively, such that practical use becomes a big problem. Therefore, solid electrolytes having a configuration without including expensive elements have been developed, but it is known that the solid electrolytes have conductivity at room temperature of about $4.9 \times 10^{-5}$ S/cm, which is about 1/10 lower than that of the lithium lanthanum zirconate based compound. In addition, in the solid electrolyte, conductivity at a low temperature is lower than conductivity at room temperature, which is a problem for practical use.

BRIEF DESCRIPTION OF THE DRAWINGS

FIG. 4 is a schematic cross-sectional diagram showing an example of a lithium battery according to an embodiment;

FIG. 5 is a schematic diagram showing one process in a method for manufacturing the electrode body according to the embodiment;

FIG. 6 is a schematic diagram showing a subsequent process to the process in the manufacturing method shown in FIG. 5;

FIG. 7 is a schematic diagram showing an electrode body manufactured by the manufacturing method shown in FIG. 6;

FIG. 8 is an exploded perspective view showing an example of a battery pack according to an embodiment;

FIG. 10 is a schematic diagram showing an example of a vehicle including the battery pack according to the embodiment.

DETAILED DESCRIPTION

Figure 1:
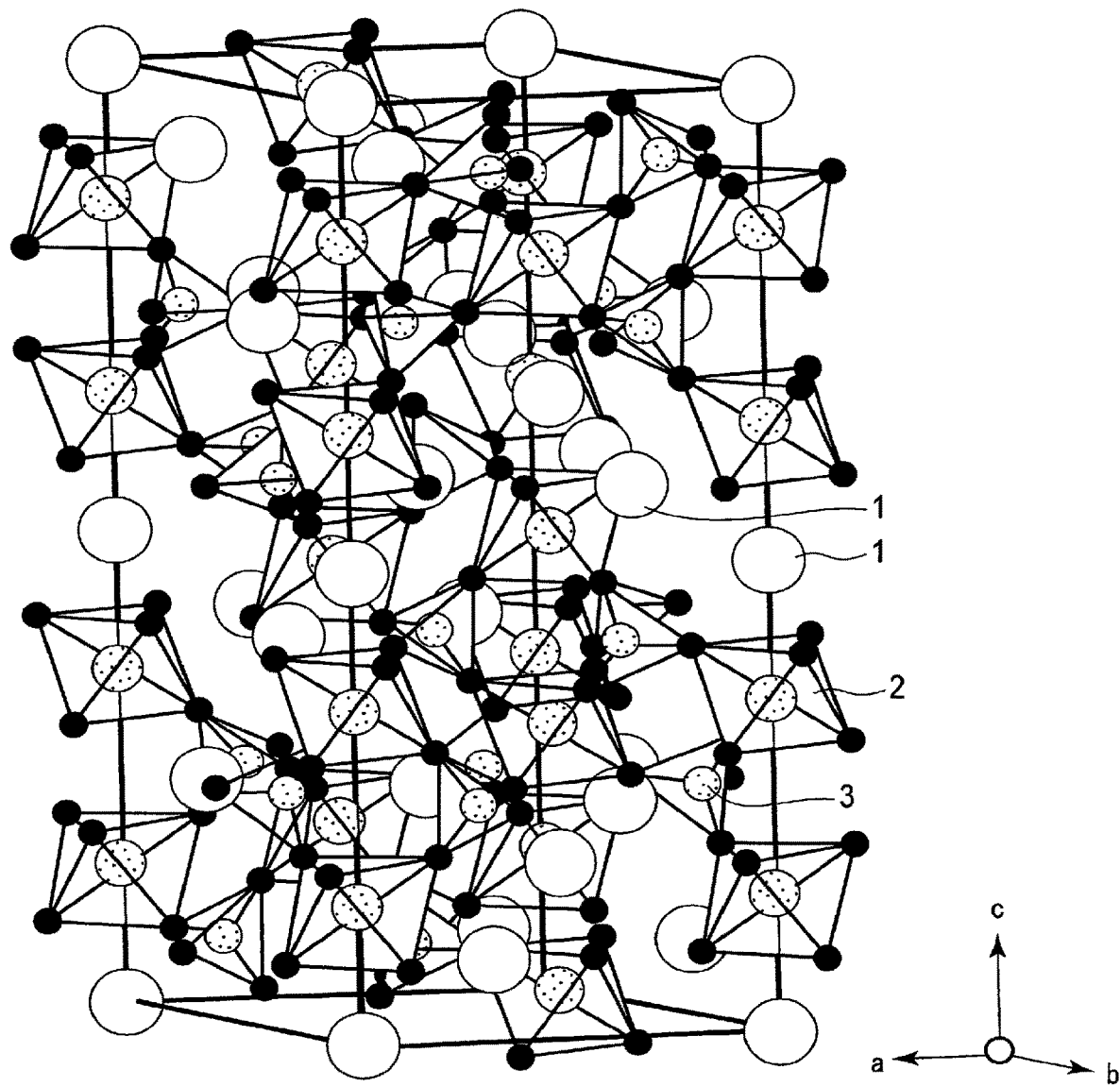
FIG. 1 is a schematic diagram showing a crystal structure of a rhombohedral crystal system of a NASICON type compound.

According to an embodiment, there is provided a solid electrolyte including an oxide represented by General Formula $Li_{1+2x}M1_{2-x}(Ca_{1+y}M2_y)_x(PO_4)_3$. In the General Formula above, M1 is at least one selected from the group consisting of Zr and Hf. M2 is at least one selected from the group consisting of Sr and Ba. x satisfies $0<x<2$. y satisfies $0<y\leq1$.

According to another embodiment, a lithium battery is provided. The lithium battery includes a positive electrode layer capable of having lithium ions inserted and extracted, a negative electrode layer capable of having lithium ions inserted and extracted; and a Li conductive layer capable of conducting lithium ions. At least one of the positive electrode layer, the negative electrode layer, and the Li conductive layer includes the solid electrolyte according to the embodiment.

According to still another embodiment, a battery pack is provided. The battery pack includes the lithium battery according to the embodiment.

According to still another embodiment, a vehicle is provided. The vehicle includes the battery pack according to the embodiment.

The solid electrolyte according to the embodiment includes an oxide based on a NASICON type crystal structure and having a crystal lattice size suitable for lithium ion conduction without using a rare earth element. By including this oxide, it is possible to provide a solid electrolyte which has a cheaper element composition, and exhibits high conductivity at a temperature lower than room temperature. Further, the solid electrolyte may be used, for example, by including the solid electrolyte in a positive electrode material and/or a negative electrode material, to thereby provide a lithium battery that is chemically stable and has high conductivity at a temperature lower than room temperature.

First Embodiment

The oxide included in the solid electrolyte according to an embodiment is represented by General Formula $Li_{1+2x}$ $M1_{2-x}(Ca_{1-y}M2_y)_x(PO_4)_3$, wherein in the Formula, M1 is at least one kind of element selected from Zr and Hf, M2 is at least one kind of element selected from Sr and Ba. In addition, in the Formula, x satisfies 0<x<2, and y satisfies 0<y≤1. The oxide has a NASICON type crystal structure, and has a structure having phosphoric acid ($PO_4$) as a framework structure. This crystal structure belongs to a rhombohedral structure, and a representative space group is R-3c. In addition, in the crystal structure, the framework structure represented by Chemical Formula $[M_2(PO_4)_3]^{n-}$ is formed, wherein $PO_4$ tetrahedrons and $MO_6$ octahedrons share all vertices to each other. In the framework structure of the rhombohedral crystal system shown in FIG. 1, there are four octahedrons around one tetrahedron and six tetrahedrons around one octahedron. It is known that conventional NASICON type compounds have the rhombohedral crystal system structure shown in FIG. 1 only at a high temperature. A phase transition in the framework structure occurs at a low temperature, resulting in a decrease in symmetry, and yields a monoclinic crystal system (space group C2/c). In addition, when atoms included in a unit cell is represented by a number Z of formula units per unit cell, the rhombohedral crystal system (R-3c) is represented by Z=6, and the monoclinic crystal system (c2/c) is represented by Z=12.

As shown in FIG. 1, the Li ions 1 exist in spaces amongst the lattice in a manner of compensating for a negative charge of the framework structure. There are four types of sites in which the Li ions are able to occupy. A first one is a largely transformed octahedral site 2, wherein one site is present per stoichiometric Chemical Formula. In addition, there is a site surrounded by eight oxygen atoms, wherein three sites are present per stoichiometric Chemical Formula. Further, there is a site occupied by element M, wherein two sites are present per stoichiometric Chemical Formula. Lastly, there is a tetrahedral site 3 interposed between two $PO_6$s, wherein one site is present per stoichiometric Chemical Formula. As described above, since the sites occupied by Li ions are widely distributed in the crystal lattice, a conductive path of Li ions is easily formed in the crystal structure. On the other hand, it is known that the phase transition of the framework structure affects movement of the Li ions. Therefore, in order to increase conductivity of the Li ions, it is preferred to have a rhombohedral crystal system structure with less phase transition in a temperature range to be used.

In the General Formula representing the NASICON type compound according to the embodiment, M1 is at least one kind selected from Zr and Hf, and M2 is at least one kind selected from Sr and Ba. This compound may correspond to a compound in which a part of Zr element is substituted with Hf, and a part of Ca element is substituted with Ba and/or Sr in the NASICON type compound represented by General Formula $Li_{1+2x}Zr_{2-x}Ca_x(PO_4)_3$ (0.1≤x≤0.4). Zr and/or Hf is arranged in the sites of the M1 element to suppress phase transition of the NASICON type structure. Ca is substituted with Ba or Sr having a larger ion radius, thereby forming a suitable element composition in configuring a path that facilitates conduction of the lithium ions. When adopting such a configuration, the framework structure is difficult to be transformed even at a low temperature. As such, the rhombohedral structure, which is called a high-temperature phase of NASICON type structure, is possible to be stabilized even at a low temperature below room temperature. Further, in this compound, the Li ions are able to easily move in a temperature range lower than room temperature. Since a framework size can be enlarged by introducing Ba or Sr into the lattice, it is difficult for the Li ions to have electronic correlation with oxide ions. As a result, the Li ions may be easily moved, particularly in a low temperature region (about −10° C., preferably about −30° C.) in which heat oscillation, which is important for movement of the Li ions, is weakened.

On the other hand, even in a compound having a monoclinic structure, which is considered that phase transition of the crystal structure largely occurs, the framework size is able to be enlarged by substituting Ba or Sr into the lattice. Therefore, Ba or Sr may be introduced also into the compound having the monoclinic structure, thereby easily moving Li ions in a temperature region lower than room temperature, in the same manner as in high temperature phase.

With regard to a compound having at least any one crystal structure of the rhombohedral structure or the monoclinic structure, when 249.3 Å³≤V/Z≤254.0 Å³ is satisfied, the Li ions are able to be easily moved. Here, V is a unit cell volume in the crystal structure, and Z is a number of formula units per unit cell in the crystal structure. When V/Z is smaller than 249.3 Å³, a narrow part is formed, which serves as a bottle neck when the Li ions move in the lattice. On the other hand, when V/Z is larger than 254.0 Å³, decentering occurs in the Li ion sites, and the lattice is easily transformed, thereby interfering with movement of the Li ions.

[Preparation Method of Compound]

An example of a method for synthesizing the compound having the NASICON type crystal structure according to the first embodiment includes a solid-state reaction method. As raw materials for the solid-state reaction, oxides of constituent elements or various salt compounds such as carbonates, nitrates, etc., that generate the constituent elements by heating, may be used. Various raw materials are mixed at a predetermined ratio so as to correspond to a target composition represented by General Formula $Li_{1+2x}M1_{2-x}(Ca_{1-y}M2_y)_x(PO_4)_3$, wherein an M1 site includes at least one kind of element selected from Zr and Hf, an M2 site includes at least one kind of element selected from Ba and Sr, x satisfies 0<x<2, and y satisfies 0<y≤1. The mixture may be fired to obtain the compound of NASICON type crystal structure according to the embodiment.

Phosphagen used in the embodiment is preferably, for example, phosphates such as ammonium dihydrogenphosphate ($NH_4H_2PO_4$), etc. As the phosphagen, the phosphate may be used alone or in combination with two or more kinds thereof. As raw materials as sources of zirconium (Zr) and hafnium (Hf), it is preferred to use oxides. The oxide as the raw materials as sources of zirconium and hafnium may be used alone or in combination with two or more kinds thereof. As raw materials as sources of lithium (Li), barium (Ba), and strontium (Sr), it is preferred to use metal salts such as chloride, carbonate, nitrate, etc. The raw materials may be used alone or in combination with two or more kinds thereof.

First, as described above, these raw materials are mixed to have a ratio corresponding to the target composition to obtain a mixture. The mixture is first subjected to a low-temperature heat treatment. Since the raw materials of the compound of the embodiment include the phosphate, if the compound is synthesized by a generally known solid-state reaction method, melting reaction is violent, such that evaporation of light elements occurs. Accordingly, it was found that when a general synthesis method is employed, generation of an impurity phase or composition deviation occurs. Therefore, the mixture is subjected to the low-temperature heat treatment in which the mixture is heated at a temperature condition of 150° C. to 350° C., for example, for 12 hours, and then taken out of a heating furnace, followed by rapid cooling, thereby promoting decomposition of the phosphate to suppress the melting reaction with other raw materials. At a temperature which is 100° C. or more greater than a melting point of the phosphate used (more than about 350° C.), the melting reaction between the phosphate and other raw materials occurs, which is not preferred since it leads to the evaporation of the light elements. Further, at a temperature lower than the melting point of the phosphate used at the beginning (less than about 150° C.), the phosphate is not sufficiently decomposed, and thus, it is difficult to obtain a decomposition effect of the phosphate.

The mixture subjected to the low-temperature heat treatment may be re-pulverized and pre-fired at 600° C. to 800° C., thereby obtaining a uniform mixing state by heat diffusion. When the pre-firing temperature is less than 600° C., it is difficult to obtain a sufficient mixing state. On the other hand, if the pre-firing temperature is more than 800° C., sintering proceeds, and thus, it is difficult to obtain the uniform mixing state. Time for pre-firing is preferably about 5 to 20 hours. The mixture after the pre-firing is performed is pulverized and mixed again, and then, is fired at 1000° C. to 1400° C. in the air or under a flow of oxygen gas or nitrogen gas, etc. Here, in order to obtain a single phase of the target NASICON structure, it is preferred to perform the firing divided into several times by repeatedly performing the firing and re-pulverization. A method for pulverization is not particularly limited.

Further, it is possible to configure an all solid battery by using positive electrode materials and negative electrode materials that include the NASICON type compound as the solid electrode electrolytes at the time of firing. Here, powders of the materials are stacked so as to have a configuration in which a NASICON type solid electrolyte layer is stacked between the positive electrode layer and the negative electrode layer in the all solid battery to be obtained. Then, the stack is solidified by press molding, etc., and fired, thereby obtaining an all solid battery in which an interfacial grain boundary is small. When a firing temperature is lower than 1000° C., reactivity is bad, and therefore not only is a long time required for firing, but it is difficult to obtain a desired phase. When the firing temperature is higher than 1400° C., evaporation of alkali metals including lithium or alkaline earth metals is increased, such that the resulting composition is easily deviated from the target composition. The sum of firing time varies depending on firing temperature, but is generally 1 to 5 hours. Among them, the firing is preferably performed at a temperature condition of 1300° C. for about 2 to 3 hours. In addition, as firing atmosphere, air is preferred in view of cost and convenience. However, when the target composition is a composition that is difficult to form the NASICON structure, it is possible to obtain a desired crystal structure by performing firing under a nitrogen atmosphere or a pure oxygen atmosphere, or by firing under a high pressure, etc. Further, it is preferred to estimate an evaporation amount in advance and mix the lithium source in excess, in order to prevent the compositional deviation due to lithium evaporation during the firing.

According to the first embodiment as described above, since the oxide represented by General Formula $Li_{1+2x}M1_{2-x}(Ca_{1-y}M2_y)_x(PO_4)_3$ is included, it is possible to provide a solid electrolyte having high conductivity at a temperature lower than room temperature with an inexpensive element composition.

Second Embodiment

A lithium battery according to an embodiment includes a positive electrode layer capable of having lithium ions inserted and extracted, a negative electrode layer capable of having the lithium ions inserted and extracted, and a Li conductive layer capable of conducting the lithium ions. At least one of the positive electrode layer, the negative electrode layer, and the Li conductive layer includes the solid electrolyte according to the first embodiment.

The positive electrode layer includes a positive electrode active material, and may be disposed on a current collector to constitute a positive electrode. The positive electrode active material is described below. The negative electrode layer includes a negative electrode active material, and may be disposed on a current collector to constitute a negative electrode. Alternatively, the positive electrode layer may be disposed on one surface of the current collector, and the negative electrode layer may be disposed on a reverse surface of the current collector to constitute an electrode having a bipolar structure. Each of the positive electrode layer and the negative electrode layer may include an electrolyte. In addition, the electrolyte that may be included in the positive electrode layer and the negative electrode layer may be the solid electrolyte according to the first embodiment.

The Li conductive layer may be a separator which is capable of conducting lithium ions and disposed, for example, between the positive electrode layer and the negative electrode layer. Alternatively, the Li conductive layer may be an electrolyte layer. The Li conductive layer as the electrolyte layer includes an electrolyte, and the electrolyte may include the solid electrolyte according to the first embodiment.

The lithium battery according to the embodiment includes a container member. The positive electrode, the negative electrode, and the electrolyte are housed in the container member. When a nonaqueous electrolyte is used together depending on the application, the nonaqueous electrolyte is also included in the container member. Further, a bipolar structure may be adopted as an electrode structure.

Figure 2:
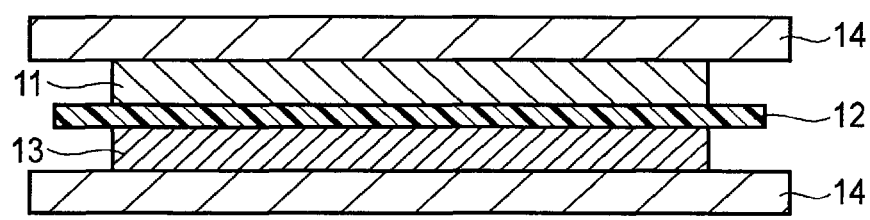
FIG. 2 is a schematic diagram showing a side view of an example of an electrode body according to an embodiment.

FIG. 2 shows an example of an electrode body that may be included in the lithium battery of the embodiment. The electrode body 10A shown in FIG. 2 includes a positive electrode layer 11, an electrolyte layer 12, a negative electrode layer 13, and a current collector 14. As shown in the drawing, the electrode body 10A has a structure in which these members are stacked so that the electrolyte layer 12 is interposed between the positive electrode layer 11 and the negative electrode layer 13, and the current collectors 14 are arranged at both ends. The electrode body 10A shown in FIG. 2 is a single stack electrode body in which a pair of the above described structures is stacked.

FIG. 2 shows an example in which the electrolyte layer 12 is included as the Li conductive layer interposed between the positive electrode layer 11 and the negative electrode layer 13. However, in the lithium battery of the embodiment, the Li conductive layer may not be the electrolyte layer 12. For example, when the positive electrode layer 11 and/or the negative electrode layer 13 include the electrolyte as described below, a separator holding an electrolyte, for example, may be disposed as the Li conductive layer between the positive electrode layer 11 and the negative electrode layer 13.

Figure 3:
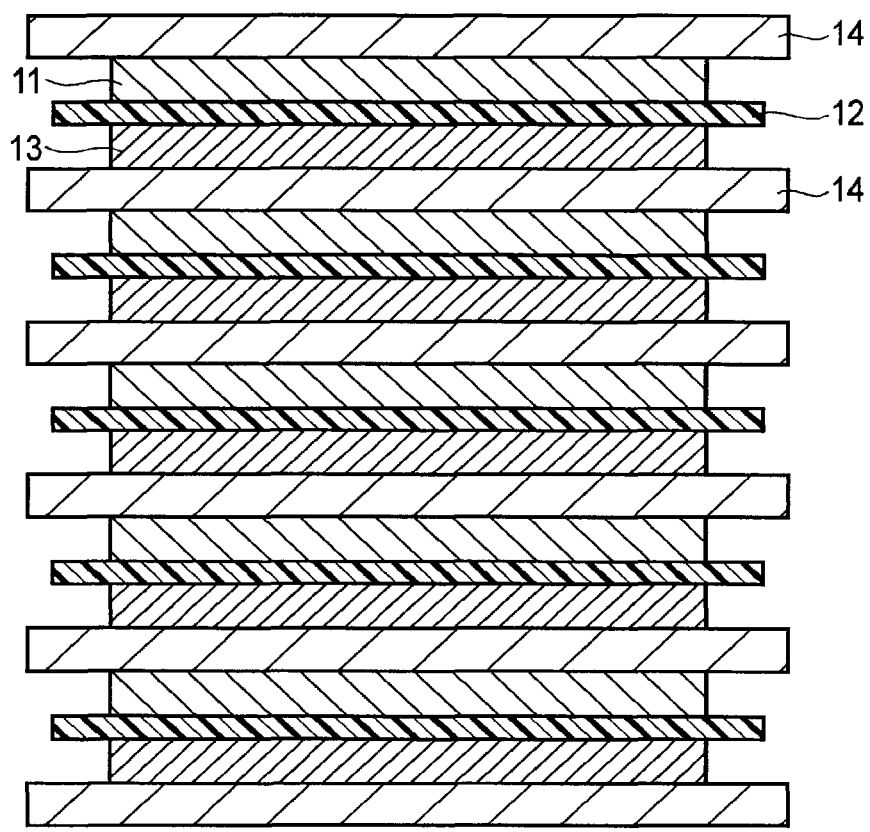
FIG. 3 is a schematic diagram showing a side view of an example of an electrode body having a bipolar electrode structure according to an embodiment.

As an example of another aspect of a lithium battery of the embodiment, an electrode body 10B having a bipolar electrode structure as shown in FIG. 3 may be configured and included in the lithium battery. That is, two or more sets of a structure set, in which the current collector 14, the negative electrode layer 13, the electrolyte layer 12, and the positive electrode layer 11 are stacked in this order, may be stacked, and the current collector 14 may be stacked on one side of the positive electrode layer 11 at the end (top of the drawing). In other words, the electrode body 10B may include plural stacks and the current collectors 14, each of the stacks including the positive electrode layer 11, the Li conductive layer, and the negative electrode layer 13 which are sequentially stacked, and the electrode body 10B may have a bipolar electrode structure in which the current collectors 14 are arranged between the positive electrode layer 11 of one stack and the negative electrode layer 13 of another stack. The number of sets of stacking this structure may be appropriately selected depending on design of a shape and a size of the battery. In the shown example, five sets are stacked. In the electrode body 10B according to the present embodiment, the positive electrode layer 11, the electrolyte layer 12, and the negative electrode layer 13 can be closely adhered to be thin. Therefore, a thin type lithium battery requiring small space and having large capacity and excellent cycle life performance, heat stability, and electrochemical stability can be obtained by stacking the plural layers. In addition, when the positive electrode layer 11 and/or the negative electrode layer 13 includes the electrolyte in the electrode body 10B having the bipolar structure, the separator including the electrolyte, etc. may be arranged as the Li conductive layer between the positive electrode layer 11 and the negative electrode layer 13 instead of the electrolyte layer 12, in the same manner as the electrode body 10A of FIG. 2.

FIG. 4 is a schematic cross-sectional view of an example of the lithium battery according to the embodiment.

As shown in FIG. 4, the lithium battery 20 includes a bipolar electrode body 10C housed in the container member 21. The electrode body 10C shown in the drawing has a structure in which two or more sets of a structure set, in which the current collector 14, the negative electrode layer 13, the electrolyte layer 12, and the positive electrode layer 11 are stacked in this order, are stacked, and a current collector 14 is stacked on one side of the positive electrode layer 11 at the top, in a manner similar to the electrode body 10B shown in FIG. 3. A positive electrode current collector tab 63A is disposed on the current collector 14 adjacent to the positive electrode layer 11 at the end (top of the drawing), and a negative electrode current collector tab 64A is disposed on the current collector 14 adjacent to the negative electrode layer 13 at the end (bottom of the drawing). A negative electrode terminal and a positive electrode terminal, which are not shown, are connected to the positive electrode current collector tab 63A and the negative electrode current collector tab 64A, respectively, and the negative electrode terminal and the positive electrode terminal extend to the outside of the container member 21.

The lithium battery 20 of FIG. 4 shows an example in which the electrode body 10C includes five sets of stacked structures in which the current collector 14, the negative electrode layer 13, the electrolyte layer 12, and the positive electrode layer 11 are stacked, in the same manner as the electrode body 10B of FIG. 3. However, the number of sets of the stacked structures included in the electrode body 10C may be, for example, one set as with the electrode body 10A of FIG. 2, or two or more sets.

Hereinafter, the electrolyte, the positive electrode layer, the negative electrode layer, and the container member are described in detail.

1) Electrolyte

In the lithium battery according to the embodiment, the positive electrode layer, the negative electrode layer, and the Li conductive layer may include the electrolyte. The electrolyte that may be included for any layer may be the solid electrolyte of the first embodiment. However, in the lithium battery according to the embodiment, the solid electrolyte of the first embodiment is included in at least one of these layers. In the lithium battery using the solid electrolyte, a safe battery may be provided since there is no concern for liquid leakage of an organic electrolytic solution or gas generation.

In the layer including the solid electrolyte having the NASICON type crystal structure described in the first embodiment, the NASICON type lithium ion conductive solid electrolyte may be used alone or may be mixed with other kinds of solid electrolytes (for example, a perovskite type solid electrolyte, a garnet type solid electrolyte, a LISOCON-based solid electrolyte, a sulfide-based solid electrolyte). A lithium battery according to a more preferred aspect includes a composite electrolyte including the NASICON type solid electrolyte according to the first embodiment and an organic electrolyte, as the electrolyte. The NASICON type solid electrolyte forms inorganic solid particles. It is preferred to form a state in which the composite electrolyte is formed with the inorganic solid particles and the organic electrolyte.

The organic electrolyte in the composite electrolyte includes lithium ions exhibiting ion conductivity and at least one kind selected from the group consisting of propylene carbonate (PC), ethylene carbonate (EC), diethyl carbonate (DEC), and methyl ethyl carbonate (MEC). In addition, when sulfide solid electrolyte particles having high Li ion conductivity are used as the organic electrolyte, it is not preferred since sulfur components become dissolved.

A weight ratio of the organic electrolyte in the composite electrolyte is desirably from 0.1% to 20%. In other words, when the total amount of the composite electrolyte is 100 parts by mass, a content of the organic electrolyte is desirably from 0.1 part by mass to 20 parts by mass. A weight ratio of the organic electrolyte in the composite electrolyte is preferably from 1% to 10%, and particularly preferably, about 4%.

The composite electrolyte may further include a binder. As the binder, it is more preferred to use polymers that form a gel with carbonates such as polyacrylonitrile (PAN), polyethylene oxide (PEO), polyvinylidene fluoride (PVdF), polymethylmethacrylate, etc. A content of the binder is preferably less than 20% by weight based on the total weight of the composite electrolyte, for example, in the case of PVdF.

The composite electrolyte is preferably a solid polymer electrolyte or a gel-like polymer electrolyte. Whether the composite electrolyte is of a solid phase or a gel phase may be appropriately adjusted by selection of composition of the organic electrolyte and the binder. When the composite electrolyte is a solid polymer electrolyte, it is generally possible to achieve a compact battery device. If the composite electrolyte is a gel-like polymer electrolyte, it is easy to perform manipulation such as manufacture of the battery device or modification of a shape, etc.

According to the composite electrolyte according to the embodiment, ion conductivity may be increased by preparing the composite electrolyte including the solid electrolyte of the first embodiment and the organic electrolyte. This is because mobile Li ion concentration is increased at the interface between the Li ion conductive inorganic solid particles and the organic electrolyte, thereby facilitating the movement of the Li ions. In addition, when a Li-containing oxide solid electrolyte having a high Li ion conductivity is used as the organic electrolyte, the movement of Li ions is better facilitated.

Further, the above-described organic electrolyte and the inorganic solid particles (the particles of the solid electrolyte according to the first embodiment) may be used, such that the inorganic solid particles become chemically stable with respect to the organic electrolyte, and do not cause problems such as dissolution of the inorganic solid particles, etc. Further, when the Li ion conductive inorganic solid particles are used, a reduction reaction that accompany Li movement is difficult to be generated even at a high temperature, and thus, stability and lifespan of the composite electrolyte can be increased.

Surfaces of the positive electrode layer 11 and the negative electrode layer 13 may not be flat, and have irregularities as shown in FIGS. 5 to 7. In the lithium battery according to the embodiment, for example, when the electrolyte layer 12 is configured by using the composite electrolyte 123 including the inorganic solid particles 121 and the organic electrolyte 122 as shown in FIG. 6, interfaces between the electrolyte layer 12 and the positive electrode layer 11 and between the electrolyte layer 12 and the negative electrode layer 13 may be formed along the irregularities of the surfaces of the positive electrode layer 11 and the negative electrode layer 13. An example is shown in FIG. 7. The inorganic solid particles 121 may include particles of the above-described solid electrolyte (the solid electrolyte particles according to the first embodiment, and other solid electrolytes). As shown in FIGS. 5 to 7, the surfaces of the positive electrode layer 11 and the negative electrode layer 13 have the irregularities due to the material (particles of active materials to be described below, etc.) configuring each electrode. In particular, the surface of the negative electrode layer 13 has a large irregularity when secondary particles of which an average secondary particle diameter is larger than 5 μm are used as negative electrode active material particles as described below. The electrolyte layer 12 is closely adhered to the positive electrode layer 11 and the negative electrode layer 13 along the irregularities. Specifically, since the organic electrolyte 122 is of a gel phase or has fluidity before curing during a preparation process described below, the organic electrolyte 122 is impregnated into a concave part formed by the particles on the surfaces of the positive electrode layer 11 and the negative electrode layer 13.

According to the structure, the surface of the electrolyte layer 12 is formed so that the surfaces of the electrolyte layer 12, and the positive electrode layer 11 and the negative electrode layer 13 are closely adhered to each other along the irregularities on the surfaces of the positive electrode layer 11 and the negative electrode layer 13, such that there are nearly no gaps between the electrolyte layer 12 and the positive electrode layer 11, and between the electrolyte layer 12 and the negative electrode layer 13. In particular, as shown in FIG. 7, when the inorganic solid particles 121A, which are a part of the inorganic solid particles 121, are included deeply in the concave part of the negative electrode layer 13, conductivity is excellently provided through the inorganic solid particles 121A on the surface including the concave part of the negative electrode layer 13. In addition, when the electrolyte layer 12 includes, for example, the inorganic solid particles 121B which are hard particles as the solid electrolyte particles, the hard inorganic solid particles 121B impart structural strength to the electrolyte layer 12, thereby securing some extent of thickness in the electrolyte layer 12. Thus, short-circuiting due to the positive electrode layer 11 and the negative electrode layer 13 becoming directly and closely adhered with each other can be prevented.

Alternatively, the composite electrolyte may be included in the positive electrode layer 11, for example, in a state in which the composite electrolyte covers at least one portion of the particles of the positive electrode active material. That is, when the electrolyte is included in the positive electrode layer 11, the above-described composite electrolyte may cover the positive electrode active material particles individually.

When the electrolyte layer 12 is used in the lithium battery according to the embodiment, for example, the electrolyte layer 12 may be manufactured by applying the organic electrolyte constituting the composite electrolyte to the positive electrode layer 11 or the negative electrode layer 13, or by injecting the organic electrolyte between the positive electrode layer 11 and the negative electrode layer 13 arranged parallel to each other.

As a more specific example, the electrolyte layer 12 may be manufactured by, for example, the following manufacturing method. In this specific example, a method of manufacturing the electrolyte layer 12 on the positive electrode layer 11 is described, but the manufacturing method of the electrolyte layer 12 according to the embodiment is not limited thereto. First, the inorganic solid particles 121 are dispersed in a solution including the binder to prepare a binder dispersion solution of the solid electrolyte particles. Here, any one of the above-described kinds is usable for the binder. The inorganic solid particles 121 may be the particles of the solid electrolyte according to the first embodiment. Next, the binder dispersion solution is applied on the positive electrode layer 11 to dispose the inorganic solid particles 121 onto the positive electrode layer 11 as shown in FIG. 5. Then, as shown in FIG. 6, the organic electrolyte 122 may be impregnated on the positive electrode layer 11, and heated and mixed to configure a gel-like composite electrolyte 123 containing the organic electrolyte 122 and the inorganic solid particles 121. Next, the positive electrode layer 11 and the negative electrode layer 13 may be arranged to face toward each other and pressed, thereby obtaining the electrode body in which the composite electrolyte layer 12 is interposed between the positive electrode layer 11 and the negative electrode layer 13 as shown in FIG. 7.

Here, when the gel-like composite electrolyte 123 is used as the electrolyte layer 12, and the negative electrode layer 13 is pressed against the composite electrolyte 123 on the positive electrode layer 11, the composite electrolyte 123 enters into gaps among the irregularities or becomes impregnated into the irregularities on the surfaces of the positive electrode layer 11 and the negative electrode layer 13, in particular, into the irregularities of the active material that may exist on the surfaces of these electrode layers. Accordingly, the positive electrode layer 11, the negative electrode layer 13, and the electrolyte layer 12 are closely adhered along the respective irregularities.

In addition, when a solid polymer is used as the organic electrolyte, the organic electrolyte having fluidity before solidification may be applied on the positive electrode layer 11. Further, in the case where fluidity of the organic electrolyte is sufficiently high when the organic electrolyte is applied on the positive electrode layer 11, a spray method, etc., may be used. The spray method may be used to dispose the composite electrolyte 123 uniformly on the positive electrode layer 11, and a thickness of the electrolyte layer 12 may be easily adjusted by adjusting an amount of the composite electrolyte 123 disposed.

In addition, when the electrolyte layer 12 is manufactured by injecting the organic electrolyte 122 between the positive electrode layer 11 and the negative electrode layer 13, specifically, for example, the electrolyte layer 12 may be prepared by a method in which the positive electrode layer 11 and the negative electrode layer 13, having the inorganic solid particles 121 arranged thereon, are arranged with a predetermined distance (a value set as the thickness of the electrolyte layer 12) therebetween, and then, the organic electrolyte 122 is injected and impregnated.

In the present embodiment, the organic electrolyte 122 and the inorganic solid particles 121 are embedded into fine concave parts of the positive electrode layer 11 and the negative electrode layer 13, and thus, the electrolyte layer 12, the positive electrode layer 11, and the negative electrode layer 13 are closely adhered without gaps. Since the interfaces between the electrolyte layer 12 and the positive electrode layer 11 and between the electrolyte layer 12 and the negative electrode layer 13 are favorably formed, the ion conductivity through the electrolyte layer 12 is improved. The positive electrode layer 11 and the negative electrode layer 13 are closely adhered with the electrolyte layer 12. Therefore, the thickness of the electrolyte layer 12 can be made to be the small range as described above.

2) Positive Electrode Layer

The positive electrode layer 11 is supported on one side of the current collector 14 in the example of the single stack electrode body 10A shown in FIG. 2. The positive electrode layer 11 includes an active material (positive electrode active material), a conductive agent, and a binder. Further, the positive electrode layer 11 may include an electrolyte. This electrolyte may be the above-described solid electrolyte (the solid electrolyte according to the first embodiment, and other solid electrolyte). In addition, an aspect in which the positive electrode layer 11 includes a nonaqueous electrolyte as the electrolyte is also possible. The nonaqueous electrolyte referred to herein includes, for example, a liquid nonaqueous electrolyte or a gel-like electrolyte based on the nonaqueous electrolyte.

It is preferred to use a foil including aluminum (Al) as the current collector 14 for supporting the positive electrode layer 11 on a surface thereof. As such an Al-containing foil, it is preferred to use an aluminum foil of pure Al (purity of 100%) or an aluminum alloy foil in which an aluminum purity is 99% or more and less than 100%. As the Al alloy, an alloy including at least one kind of element selected from the group consisting of Fe, Mg, Zn, Mn and Si in addition to Al is preferred. For example, an Al—Fe alloy, an Al—Mn-based alloy, and an Al—Mg-based alloy are able to obtain higher strength than that of Al. On the other hand, a content of transition metals such as Cu, Ni, Cr, etc., in the Al and Al alloys is preferably 100 ppm or less (including 0 ppm). For example, the Al—Cu-based alloy has increased strength, but deteriorated corrosion resistance, and thus, the Al—Cu-based alloy is not suitable as the current collector 14.

A more preferable Al purity used for the current collector 14 on which the positive electrode layer 11 is supported is in a range of from 99.0% to 99.99%. Within this range, deterioration of a high-temperature cycle lifespan due to dissolution of impurity elements can be reduced.

Examples of the positive electrode active material may include Li—Mn composite oxide, Li—Ni composite oxide, Li—Co—Al composite oxide, Li—Ni—Co—Mn composite oxide, spinel type Li—Mn—Ni composite oxide, Li—Mn—Co composite oxide, olivine type Li iron phosphate (LiFePO$_4$) or Li Mn phosphate (LiMnPO$_4$), etc. One kind of them may be used alone, or two or more kinds thereof may be mixed to be used.

For example, the Li—Mn composite oxides such as Li$_x$Mn$_2$O$_4$ or Li$_x$MnO$_2$, etc., Li—Ni—Al composite oxides such as Li$_x$Ni$_{1-y}$Al$_y$O$_2$, etc., Li—Co composite oxides such as Li$_x$CoO$_2$, etc., Li—Ni—Co composite oxides such as Li$_x$Ni$_{1-y-z}$Co$_y$Mn$_z$O$_2$, etc., Li—Mn—Co composite oxides such as Li$_x$Mn$_y$Co$_{1-y}$O$_2$, etc., the spinel type Li—Mn—Ni composite oxides such as Li$_x$Mn$_{2-y}$Ni$_y$O$_4$, etc., Li phosphate having an olivine structure such as Li$_x$FePO$_4$, Li$_x$CoPO$_4$, etc., for example, fluorinated iron sulfate Li$_x$FeSO$_4$F may be included. In the above General Formula, x and y preferably have a range of 0 to 1 unless otherwise specified. These composite oxides are preferably used because it is possible to obtain a high positive electrode voltage. Among them, the Li—Ni—Al composite oxide, the Li—Ni—Co—Mn composite oxide, and the Li—Mn—Co composite oxide may suppress the reaction with the nonaqueous electrolyte under a high temperature environment to greatly improve battery lifespan. In particular, the Li—Ni—Co—Mn composite oxide represented by Li$_x$Ni$_{1-y-z}$Co$_y$Mn$_2$O$_2$ (0<x<1.1, 0<y<0.5, 0<z<0.5) is preferred. High temperature durability lifespan may be obtained by using the Li—Ni—Co—Mn composite oxide.

The conductive agent is added to increase electron conductivity in the positive electrode layer 11 and to suppress contact resistance with the current collector 14. The conductive agent may include, for example, acetylene black, carbon black, or graphite, etc.

The binder for binding the active material and the conductive agent may be, for example, polytetrafluoroethylene (PTFE), polyvinylidene fluoride (PVdF), fluorine-based rubber, etc.

Regarding a mixing ratio of the positive electrode active material, the conductive agent, and the binder, the positive electrode active material is preferably in a range of from 80 wt % to 95 wt %, the conductive agent is preferably in a range of from 3 wt % to 18 wt %, and the binder is preferably in a range of from 2 wt % to 7 wt %. When a content of the conductive agent is 3 wt % or more, the above-described effect may be exhibited, and when the content of the conductive agent is 18 wt % or less, decomposition of the nonaqueous electrolyte on the surface of the conductive agent under high temperature may be reduced. When a content of the binder is 2 wt % or more, sufficient electrode strength may be obtained, and when the content of the binder is 7 wt % or less, an insulating part of the electrode may be reduced.

The positive electrode layer 11 may be supported on the current collector 14 by, for example, suspending the positive electrode active material, the conductive agent, and the binder, and optionally the solid electrolyte in an appropriate solvent, applying the suspension to the current collector 14, and drying a coated film on the current collector 14, followed by pressing. A pressure at the time of pressing the positive electrode is preferably in a range of from 0.15 ton/mm to 0.3 ton/mm. Within this range, it is preferred since an elongation rate of a positive electrode current collector foil is 20% or less, and simultaneously, adhesion property (peel strength) between the positive electrode layer and the aluminum foil positive electrode current collector is increased.

3) Negative Electrode Layer

The negative electrode layer 13 is supported on one side of the current collector 14 in the example of the single stack electrode body 10A shown in FIG. 2. The negative electrode layer 13 includes an active material (negative electrode active material), a conductive agent, and a binder. Further, the negative electrode layer 13 may include an electrolyte. This electrolyte may be the above-described solid electrolyte (the solid electrolyte according to the first embodiment, and other solid electrolyte). In addition, an aspect in which the negative electrode layer 13 includes a nonaqueous electrolyte as the electrolyte is also possible. The nonaqueous electrolyte referred to herein includes, for example, a liquid nonaqueous electrolyte or a gel-like electrolyte based on the nonaqueous electrolyte.

It is preferred to use a foil including aluminum (Al) as the current collector 14 for supporting the negative electrode layer 13 on a surface thereof. As such Al-containing foil, Al foil or Al alloy foil is preferred. In particular, it is preferred to use aluminum foil of pure Al (purity of 100%) or aluminum alloy foil in which an aluminum purity is 98% or more and less than 100%. The purity of the aluminum foil is more preferably 99.99% or more. The thickness of the Al foil and the Al alloy foil may be, for example, 20 µm or less, and more preferably 15 µm or less. As the Al alloy, an alloy including at least one kind of element selected from the group consisting of Fe, Mg, Zn, Mn and Si in addition to Al is preferred. For example, an Al—Fe alloy, an Al—Mn-based alloy, and an Al—Mg-based alloy are able to obtain higher strength than that of Al. On the other hand, a content of transition metals such as Cu, Ni, Cr, etc., in the Al and Al alloys is preferably 100 ppm or less (including 0 ppm). For example, the Al—Cu-based alloy has increased strength, but deteriorated corrosion resistance, and thus, the Al—Cu-based alloy is not suitable as the current collector 14.

A more preferable Al purity used for the current collector 14 on which the negative electrode layer 13 is supported is in a range of from 98% to 99.95%. As described later, Ti-containing oxide particles of which the secondary particle diameter is 2 µm or more may be used as the negative electrode active material particles in the embodiment, thereby reducing a negative electrode pressing pressure to reduce elongation of the Al foil. Accordingly, this purity range becomes appropriate. As a result, electron conductivity of the Al foil current collector may be increased, and further, disintegration of the secondary particles of the Ti-containing oxide described below may be suppressed, thereby obtaining a low-resistance negative electrode layer.

Examples of the negative electrode active material that can have Li inserted and extracted may include a carbon material, a graphite material, a Li alloy material, a metal oxide, and a metal sulfide. Among them, it is preferred to include a Ti element. It is particularly preferred to select negative electrode active material particles of at least one kind of Ti-containing oxide selected from Li—Ti oxide, Ti oxide, Nb—Ti oxide and Li—Na—Nb—Ti oxide which have a potential of having Li ions inserted and extracted within a range of from 1 V to 3 V (vs. Li/Li$^+$) based on a redox potential of lithium.

Examples of the Li—Ti oxide may include a spinel structure Li—Ti oxide represented by General Formula Li$_{4+x}$Ti$_5$O$_{12}$(−1≤x≤3), a ramsdellite structure Li—Ti oxide represented by General Formula Li$_{2+x}$Ti$_3$O$_7$Li$_{1+x}$Ti$_2$O$_4$, General Formula Li$_{1.1+x}$Ti$_{1.8}$O$_4$, General Formula Li$_{1.07+x}$Ti$_{1.86}$O$_4$, General Formula Li$_x$TiO$_2$(0≤x), etc., Ti oxide having a monoclinic structure represented by General Formula Li$_x$TiO$_2$(0≤x) (TiO$_2$(B) as a structure before charging), Ti oxide having a rutile structure or an anatase structure (TiO$_2$ as a structure before charging), niobium-titanium (Nb—Ti) oxide represented by General Formula Li$_a$TiM$_b$Nb$_{2\pm\beta}$O$_{7\pm o}$ (0<a<5, 0<b<0.3, 0<β<0.3, 0<o<0.3, M is at least one kind of element selected from the group consisting of Fe, V, Mo, and Ta), and titanium composite oxide represented by General Formula Li$_{2+a}$M(I)$_{2-b}$Ti$_{6-c}$M(II)$_d$O$_{14+o}$ (M(I) is Na, or includes Na and at least one kind of element selected from the group consisting of Sr, Ba, Ca, Mg, Cs and K; M(II) is at least one kind of element selected from the group consisting of Zr, Sn, V, Nb, Ta, Mo, W, Fe, Co, Mn, and Al; 0≤a≤6, 0≤b<2, 0<c<6, 0<d<6, −0.5≤σ≤0.5), etc. One kind of them may be used alone, or two or more kinds thereof may be mixed to be used. The spinel structure Li—Ti oxide represented by General Formula Li$_{4+x}$Ti$_5$O$_{12}$ (−1≤x≤3) with a very small volume change is more preferred. These Ti-containing oxides may be used, and thus, the Al foil is usable in the same manner as a positive electrode current collector instead of conventional copper foils as a current collector for supporting the negative electrode layer. As a result, light weight and cost reduction of the lithium battery may be realized. Further, it is advantageous in view of weight and capacity per size of the lithium battery having the bipolar electrode structure described below.

The particles of the negative electrode active material preferably have an average particle diameter of primary particles that is 1 µm or less, and simultaneously, a specific surface area measured according to the BET method by N$_2$ adsorption of from 3 m$^2$/g to 200 m$^2$/g. Accordingly, when the nonaqueous electrolyte is used in the lithium battery, affinity between the negative electrode layer 13 and the nonaqueous electrolyte may be increased. In addition, the average particle diameter of the primary particle may be set to be 1 µm or less, thereby shortening a diffusion distance of Li ions in the active material. Further, the specific surface area can be increased. A method for measuring the specific surface area by the BET method is described below. Further, a more preferred average particle diameter is from 0.1 µm to 0.8 µm.

A reason that the average particle diameter of the negative electrode active material is set to the above-described range is because when the specific surface area of the negative electrode layer 13 is made large of from 3 m$^2$/g to 50 m$^2$/g by using the primary particles of which an average particle diameter is more than 1 µm, reduction in porosity of the negative electrode layer 13 may not be avoided. However, when the average particle diameter is small, agglomeration of the particles easily occurs. For example, when the nonaqueous electrolyte is used, distribution of the nonaqueous electrolyte is biased toward the negative electrode layer 13, which may cause depletion of the electrolyte in the positive electrode layer 11, and thus, a lower limit value is preferably set to be 0.001 µm.

The negative electrode active material particles may include the secondary particles in addition to the above-described primary particles. It is preferred that the average particle diameter (diameter) of the secondary particles of the negative electrode active material is larger than 2 µm. It is more preferred that the secondary particle diameter of the negative electrode active material is larger than 5 µm. The most preferred secondary particle diameter is from 7 µm to 20 µm. Within this range, a high-density negative electrode may be manufactured while keeping a pressure of a negative electrode press low, and elongation of the Al-containing foil as the current collector may be suppressed.

The negative electrode active material in which the average particle diameter of the secondary particles is larger than 2 µm may be obtained, for example, as follows. First, active material raw materials are reacted to synthetically prepare an active material precursor having an average particle diameter of 1 μm or less, followed by firing treatment. The fired product is pulverized using a pulverizer such as a ball mill, a jet mill, etc., and firing treatment is further performed, such that the active material precursor is agglomerated to be grown into the secondary particles having a large particle diameter.

Further, it is preferred to cover the surface of the secondary particles with a carbon material to reduce electric resistance in the negative electrode layer. The secondary particles of the negative electrode active material covered with the carbon material may be manufactured, for example, by adding a precursor of the carbon material in a process for manufacturing the secondary particles, and firing at a temperature of 500° C. or higher under an inert atmosphere.

Further, the secondary particles and the primary particles of Ti-containing oxide as the negative electrode active materials may be mixed in the negative electrode layer 13. In view of higher densification, it is preferred that the primary particles are present in an amount of from 5 vol % to 50 vol % in the negative electrode layer.

Next, a reason that the specific surface area of the negative electrode layer 13 is defined in the above range is described. When the specific surface area is less than 3 $m^2/g$, the agglomeration of the particles is prominent. For example, when the nonaqueous electrolyte is used, the affinity between the negative electrode layer 13 and the nonaqueous electrolyte is lowered, which increases interface resistance of the negative electrode layer 13, and as a result, output performance and charge and discharge cycle performance are deteriorated. On the other hand, when the specific surface area is more than 50 $m^2/g$, the distribution of the nonaqueous electrolyte is biased toward the negative electrode layer 13, resulting in a shortage of the nonaqueous electrolyte in the positive electrode layer 11, and thus, the output performance and the charge and discharge cycle performance may not be improved. A more preferred range of the specific surface area is from 5 $m^2/g$ to 50 $m^2/g$. Here, the specific surface area of the negative electrode layer 13 means the surface area per 1 g of the negative electrode layer.

The negative electrode layer 13 may be, for example, a porous layer including the negative electrode active material, the conductive agent, and the binder, which are supported on the current collector. When the negative electrode layer 13 is porous, it is preferred that porosity (excluding the current collector) is within a range of from 20% to 50%. Accordingly, for example, when the nonaqueous electrolyte is used in the lithium battery, it is possible to obtain the negative electrode layer 13 having a high-density while simultaneously having excellent affinity between the negative electrode layer 13 and the nonaqueous electrolyte. A more preferable range of the porosity is from 25% to 40%.

As the conductive agent, for example, a carbon material may be used. Examples of the carbon material may include acetylene black, carbon black, cokes, carbon fiber, graphite, Al powder, TiO, etc. More preferably, the cokes, the graphite, TiO powder having an average particle diameter of 10 μm or less, or the carbon fiber having an average fiber diameter of 1 μm or less, in which a heat treatment temperature is from 800° C. to 2000° C., is preferred. With regard to these carbon materials, the specific surface area measured by a BET method by $N_2$ adsorption is preferably 10 $m^2/g$ or more.

Examples of the binder may include polytetrafluoroethylene (PTFE), polyvinylidene fluoride (PVdF), fluorine-based rubber, styrene butadiene rubber, and core shell binder, etc.

Regarding a mixing ratio of the active material, the conductive agent, and the binder of the negative electrode layer 13, the negative electrode active material is preferably in a range of from 80 wt % to 95 wt %, the conductive agent is preferably in a range of from 3 wt % to 18 wt %, and the binder is preferably in a range of from 2 wt % to 7 wt %.

As an addition amount of the binder is larger, dispersibility of the particles tends to be increased. However, the surface of the particles is easily covered with the binder, and thus, the specific surface area of the negative electrode layer 13 is reduced. On the other hand, when the addition amount of the binder is small, the particles easily agglomerate, and thus, it is preferred to adjust stirring conditions (the number of revolutions of a ball mill, stirring time and stirring temperature) to suppress the agglomeration of particles. Accordingly, fine particles may be uniformly dispersed, and the negative electrode layer 13 in the embodiment may be obtained. In addition, even if the addition amount of the binder and the stirring conditions are included within appropriate ranges, when the addition amount of the conductive agent is large, the surface of the negative electrode active material is easily covered with the conductive agent, and pores on the surface of the negative electrode are also decreased, and thus, the specific surface area of the negative electrode layer 13 becomes smaller.

On the other hand, when the addition amount of the conductive agent is small, the negative electrode active material is easily pulverized, and thus, the specific surface area of the negative electrode layer 13 becomes large, or dispersibility of the negative electrode active material particles is lowered, such that the specific surface area of the negative electrode layer 13 becomes smaller. Further, not only the addition amount of the conductive agent, but also the average particle diameter and specific surface area of the conductive agent may affect the specific surface area of the negative electrode layer 13. It is preferred that the conductive agent has an average particle diameter which is the same as or less than the average particle diameter of the negative electrode active material, and a specific surface area larger than that of the negative electrode active material.

The negative electrode layer 13 may be supported onto the current collector 14 by, for example, suspending the above-described negative electrode active material, the conductive agent, and the binder, and optionally the solid electrolyte in an appropriate solvent, applying the suspension to the current collector 14, and drying a coated film on the current collector 14, followed by heating press. Here, it is preferred to uniformly disperse the particles of the negative electrode active material in a state where the addition amount of the binder is small.

4) Container Member

The above-described electrode bodies 10A-10C may be housed in a container as the container member 21. As the container for housing the electrode bodies 10A to 10C, a metal container or a container made of a laminate film may be used.

As the metal container, a metal can that has an angular shape or a cylindrical shape and that is made of Al, an Al alloy, iron, stainless steel, or the like, may be used. In addition, a plate thickness of the container is preferably 0.5 mm or less, and more preferably, 0.3 mm or less.

As the laminate film, for example, a multilayer film in which an Al foil is covered with a resin film, etc., may be used. As the resin, polymers such as polypropylene (PP), polyethylene (PE), nylon, or polyethylene terephthalate (PET), etc., may be used. In addition, a thickness of the laminate film is preferably 0.2 mm or less. The Al foil preferably has a purity of 99.5% or more.

The metal can made of the Al alloy preferably is made of an alloy having 99.8% or less of Al purity and including at least one kind of element selected from the group consisting of Mn, Mg, Zn, and Si. The Al alloy may be used, such that strength of the metal is drastically increased, thereby thinning a thickness of the metal can. As a result, it is possible to realize a thin, lightweight, high-output battery with excellent heat dissipation.

The lithium battery may be connected in series or in parallel, and may be combined with other kinds of batteries, and/or combined with a casing, etc., to form a battery pack. The battery pack may have a configuration which is appropriately selected among conventionally known configurations. Further, a specific example of the configuration of the battery pack is described in detail below.

<Powder X-Ray Diffraction Measurement>

As described above, it is preferred that the lithium battery according to the embodiment includes the solid electrolyte according to the first embodiment, i.e., the solid electrolyte including a compound represented by General Formula $Li_{1+2x}M1_{2-x}(Ca_{1-y}M2_y)_x(PO_4)_3$, wherein M1 is at least one kind of element selected from Zr and Hf, M2 is at least one kind of element selected from Ba and Sr, x satisfies 0<x<2, and y satisfies 0<y≤1, in at least any one of the positive electrode layer, the negative electrode layer, and the Li conductive layer. The inclusion of the solid electrolyte in the lithium battery is able to be examined, for example, by the following method.

As a method for taking the solid electrolyte out from the battery, for example, in the case of an all solid battery, an electrolyte layer may be taken out by scraping off a positive electrode layer and a negative electrode layer through polishing an electrode body taken out from the battery. The taken out electrolyte layer is pulverized until an average particle diameter is about 10 μm. The average particle diameter may be determined by laser diffraction. The pulverized sample is filled in a flat plate holder part having a depth of 0.2 mm formed on a glass sample plate. Here, the sample should be sufficiently filled in the holder part. Further, caution is required so as not to cause cracks, voids, etc., due to insufficient filling of the sample. Subsequently, the sample is smoothed by sufficient pressing using another glass plate from the outside. Here, caution is required so that irregularities should not occur on a reference surface of the holder due to excess or deficiency of a filling amount. Subsequently, the glass plate filled with the sample is placed in a powder X-ray diffractometer, and X-ray diffraction (XRD) patterns are obtained using a Cu-Kα line.

In addition, when an orientation property of the sample is high, there is a possibility that a peak position shifts or a peak intensity ratio changes depending on the method for filling the sample. When the sample has a high orientation property, the sample is sealed in a capillary, placed on a rotating sample stand, and rotated during the measurement. According to this method, the XRD patterns of the active material can be obtained with influence of the orientation property reduced. When an intensity ratio measured by this method is different from an intensity ratio measured using the flat plate holder described above, the influence due to the orientation is considerable, such that measurement results of the rotating sample stand are adopted.

In addition, when this method is used for the measurement, it is possible to exclude differences in the measurement result according to an operator, and to improve reproducibility. A lattice constant is able to be refined by Rietveld analysis, etc., from the obtained diffraction patterns.

When the electrolyte layer used in the lithium battery includes the composite electrolyte in which the solid electrolyte and the polymer electrolyte are mixed, the surface of the electrode body taken out from the battery may be washed with a solvent such as ethyl methyl carbonate, for example, to expose the surface to which the solid electrolyte is applied. The measurement is performed by setting the surface onto which the inorganic solid particles are applied so as to be at the same height as a surface of the glass holder for XRD. Here, the peaks belonging to the active material (positive electrode active material or negative electrode active material) included in the sample are identified in advance. The peaks of these active materials are separated from the spectrum after the measurement, and various analyses are performed. For the separation of the peaks, multiple phase analysis using the Rietveld method is preferred.

<Method for Measuring Specific Surface Area>

The specific surface area is measured by adsorbing a molecule in which an adsorption occupancy area is already known, onto a powder particle surface at a temperature of liquid nitrogen, and calculating the specific surface area of the sample from the amount. The BET method using low temperature and low humidity physical adsorption of inert gas is the most widely used method. This BET method is based on BET theory, which is the most famous theory as a method for calculating the specific surface area in which Langmuir theory which is a monomolecular layer adsorption theory is extended to multimolecular layer adsorption. The thus-obtained specific surface area is referred to as BET specific surface area.

In the lithium battery according to the second embodiment as described above, at least any one of the positive electrode layer, the negative electrode layer, and the Li conductive layer includes the solid electrolyte according to the first embodiment, and thus, it is possible to configure the battery at an inexpensive value, while simultaneously exhibiting excellent discharge rate performance at a low temperature.

Third Embodiment

According to a third embodiment, a battery pack is provided. The battery pack includes the lithium battery according to the second embodiment.

The battery pack according to the third embodiment may include one or more lithium batteries (single-batteries) according to the second embodiment described above. The plural lithium batteries, which may be included in the battery pack according to the third embodiment, may be electrically connected to each other in series, in parallel or in a combination of in series and in parallel. The plural batteries may be electrically connected to compose a battery module. The battery pack according to the third embodiment may include plural battery modules.

As described in the second embodiment, the lithium battery (single-battery) included in the battery pack may include a single stack electrode body like the electrode body 10A shown in FIG. 2, or alternatively, include a bipolar electrode structure like the electrode body 10B shown in FIG. 3.

The battery pack according to the third embodiment may further include a protective circuit. The protective circuit has a function of controlling the charge and discharge of the battery. Alternatively, a circuit included in equipment that uses the battery pack as a power source (for example, an electronic device, a vehicle such as an automobile, or the like) may be used as the protective circuit of the battery pack.

Moreover, the battery pack according to the third embodiment may further include an external power distribution terminal. The external power distribution terminal is configured to externally output current from the lithium battery and/or to input current into the lithium battery. In other words, when the battery pack is used as a power source, the current is externally provided through the external power distribution terminal. When the battery pack is charged, the charge current (including a regenerative energy of power of a vehicle such as an automobile, or the like) is provided to the battery pack through the external power distribution terminal.

Next, an example of the battery pack according to the third embodiment is explained with reference to the drawings.

Figure 9:
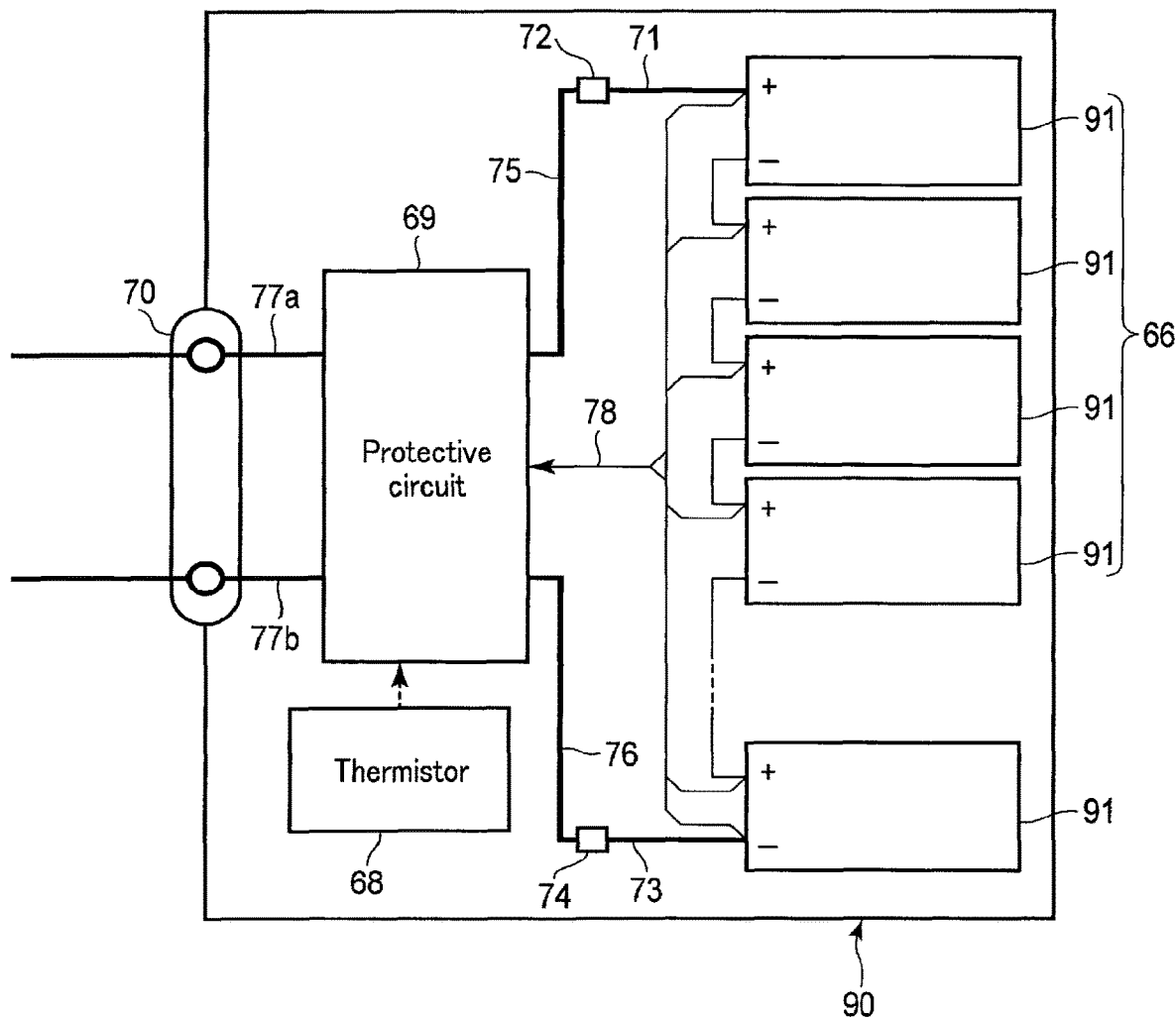
FIG. 9 is a block diagram showing an electric circuit of the battery pack of FIG. 8.

FIG. 8 is an exploded perspective view schematically showing an example of the battery pack according to the third embodiment. FIG. 9 is a block diagram showing an electric circuit of the battery pack in FIG. 8.

The battery pack 90 shown in FIGS. 8 and 9 include plural single-batteries 91. Each of the plural single-batteries 91 may be the lithium battery 20 described with reference to FIG. 4.

Plural single-batteries 91 are stacked such that externally extending negative electrode terminals 63 and positive electrode terminals 64 are arranged in the same direction, and the resulting stack is fastened with an adhesive tape 65 to form a battery module 66. The single-batteries 91 are electrically connected to each other in series, as shown in FIG. 9.

A printed wiring board 67 is disposed facing the side surfaces of the single-batteries 91 from which the negative electrode terminals 63 and the positive electrode terminals 64 extend out. A thermistor 68, a protective circuit 69, and an external power distribution terminal 70 are mounted on the printed wiring board 67, as shown in FIG. 9. An electric insulating plate (not shown) is attached to the surface of the printed wiring board 67 facing the battery module 66 to avoid unnecessary connection with wirings of the battery module 66.

A positive electrode-side lead 71 is connected to a positive electrode terminal 64 located at the lowermost layer of the battery module 66, and the distal end of the lead 71 is inserted into a positive electrode-side connector 72 on the printed wiring board 67 and thus electrically connected to the connector. A negative electrode-side lead 73 is connected to a negative electrode terminal 63 located at the uppermost layer of the battery module 66, and the distal end of the lead 73 is inserted into a negative electrode-side connector 74 on the printed wiring board 67 and thus electrically connected to the connector. The connectors 72 and 74 are connected to the protective circuit 69 through wirings 75 and 76 formed on the printed wiring board 67.

The thermistor 68 detects the temperature of the single-batteries 91, and the detection signals are sent to the protective circuit 69. The protective circuit 69 can shut down a plus-side wiring 77a and a minus-side wiring 77b between the protective circuit 69 and the external power distribution terminal 70 under predetermined conditions. A predetermined condition is, for example, the case where the temperature detected by the thermistor 68 becomes a predetermined temperature or higher. Another example of the predetermined condition is the case when the over-charge, over-discharge or over-current of the single-batteries 91 is detected. The detection of the over-charge, or the like, is performed for each individual single-battery 91 or for the entire battery module 66.

When each individual single-battery 91 is detected, the battery voltage may be detected, or the positive electrode potential or negative electrode potential may be detected. In the latter case, a lithium electrode, which is used as a reference electrode, is inserted into each individual single-battery 91. In the case of FIGS. 8 and 9, a wiring 78 for voltage detection is connected to each of the single-batteries 91, and the detected signals are sent to the protective circuit 69 through the wirings 78.

Protective sheets 79, made of rubber or resin, are arranged on three side planes of the battery module 66 except for the side plane from which the positive electrode terminals 64 and the negative electrode terminals 63 protrude out.

The battery module 66 is housed in a housing container 80 together with the protective sheets 79 and the printed wiring board 67. That is, the protective sheets 79 are arranged on both internal surfaces in a long side direction and one internal surface in a short side direction of the housing container 80, and the printed wiring board 67 is disposed on the internal surface on the opposite side in the short side direction. The battery module 66 is located in a space surrounded by the protective sheets 79 and the printed wiring board 67. A lid 81 is attached to the upper surface of the housing container 80.

In order to fix the battery module 66, a heat-shrinkable tape may be used instead of the adhesive tape 65. In such a case, the battery module 66 is fastened by placing the protective sheets 79 on both side surfaces of the battery module 66, revolving the heat-shrinkable tape around the battery module 66, and thermally shrinking the heat-shrinkable tape.

In FIGS. 8 and 9, an aspect has been shown in which the single-batteries 91 are connected in series; however, in order to increase the battery capacity, the cells may be connected in parallel. Alternatively, the connection in series and the connection in parallel may be combined. Furthermore, assembled battery packs 90 may be connected to each other in series and/or in parallel.

In addition, although the battery pack shown in FIGS. 8 and 9 include plural single-batteries 91, the battery pack according to the third embodiment may include only one single-battery 91.

The aspect of the battery pack 90 may be appropriately changed depending on the application thereof. The battery pack 90 can be suitably used in applications in which excellent cycle performance is demanded along with large current performance. Specific uses include, for example, as a power source of a digital camera, as a battery for installing in a vehicle such as a two- or four-wheeled hybrid electric automobile, a two- or four-wheeled electric automobile, a power-assisted bicycle, or a railway car, or as a stationary battery. In particular, the battery pack 90 is suitably used for a battery installed in a vehicle.

In a vehicle having the battery pack according to the third embodiment installed, the battery pack is configured, for example, to recover regenerative energy from power of the vehicle. Examples of the vehicle include two to four-wheeled hybrid electric automobiles, two to four-wheeled electric automobiles, electric assist bicycles, and railway cars such as electric trains.

FIG. 10 shows an example of an automobile that includes a battery pack according to the third embodiment.

The automobile 41 shown in FIG. 10 includes a battery pack 42, which is an example of the battery pack according to the third embodiment, installed in the engine compartment thereof. The installing position is not limited to engine compartments. For example, the battery pack may also be installed in rear parts of automobiles or under seats.

The above described battery pack according to the third embodiment includes the lithium battery according to the second embodiment. Therefore, the battery pack according to the third embodiment can exhibit excellent low temperature rate performance.

EXAMPLES

Hereinafter, the above-described embodiments are described in more detail based on Examples below.

1. NASICON Type Solid Electrolyte

As described below, a NASICON type solid electrolyte represented by General Formula $Li_{1+2x}M1_{2-x}(Ca_{1-y}M2_y)_x(PO_4)_3$ was synthesized, and an all solid battery using this solid electrolyte was manufactured.

First, raw materials were weighed in a predetermined molar ratio in order to obtain a target composition shown in Table 1 below, and mixed in a mortar. The used raw materials (sources of constituent elements) and amounts thereof are shown in Table 2 below. Then, in Examples A-1 to A-13, in order to decompose phosphate, the mixtures were placed in an electric furnace, heated at 300° C. for 12 hours, taken out of the heating furnace, and cooled at a cooling rate of 100° C./min. The mixture was pulverized again, and pre-firing was performed at a temperature condition of 800° C. for 12 hours. Each mixture was pulverized and mixed again, followed by uniaxial pressing into a pellet form (coin form) having a thickness of 1 mm and a diameter of 12 mm, and main firing for 3 hours at a temperature condition of 1350° C., thereby obtaining the solid electrolytes of Examples A-1 to A-13.

Solid electrolytes of Comparative Example A-1, Example A-14 and Example A-15 were obtained in the same manner as in Examples A-1 to A-13 except that the heat treatment for decomposing the phosphate as a raw material at 350° C. or less was not performed, but a synthesis method described in "Hui Xie et al., RSC Advances, 2011, 1, 1728-1731" was followed. Specifically, the raw materials mixture was fired at a temperature condition of 500° C. for 1 hour, followed by firing at a temperature condition of 800° C. for 6 hours. Subsequently, the fired product was molded into pellets, and then, the pellets were fired at a temperature condition of 1200° C. for 20 hours.

Then, both of reverse surfaces of the pellets of the solid electrolytes obtained for the respective Examples and Comparative Examples were polished and smoothed, and side surfaces of the pellets (edge portion of the coin shape) were covered with a masking tape. Gold was deposited on the both surfaces of the pellets smoothed by polishing to manufacture blocking electrodes.

Table 1 below summarizes compositions of the solid electrolytes synthesized in Examples A-1 to A-15 and Comparative Example A-1, and whether or not the heat treatment for decomposing the phosphate as the raw material during the synthesis was performed.

TABLE 1

| Series | Composition | $Li_{1+2x}M1_{2-x}(Ca_{1-y}M2_y)_x(PO_4)_3$ | | | | Heat treatment for decomposing phosphate |
|---|---|---|---|---|---|---|
| | | M1 | M2 | x | y | |
| Comparative Example A-1 | $Li_{1.2}Zr_{1.9}Ca_{0.1}(PO_4)_3$ | Zr | — | 0.1 | 0 | not performed |
| Example A-1 | $Li_{1.2}Zr_{1.9}(Ca_{0.95}Ba_{0.05})_{0.1}(PO_4)_3$ | Zr | Ba | 0.1 | 0.05 | performed |
| Example A-2 | $Li_{1.2}Zr_{1.9}(Ca_{0.8}Ba_{0.2})_{0.1}(PO_4)_3$ | Zr | Ba | 0.1 | 0.2 | performed |
| Example A-3 | $Li_{1.2}Zr_{1.9}(Ca_{0.5}Ba_{0.5})_{0.1}(PO_4)_3$ | Zr | Ba | 0.1 | 0.5 | performed |
| Example A-4 | $Li_{1.2}Zr_{1.9}(Ca_{0.05}Ba_{0.95})_{0.1}(PO_4)_3$ | Zr | Ba | 0.1 | 0.95 | performed |
| Example A-5 | $Li_{1.2}Zr_{1.9}Ba_{0.1}(PO_4)_3$ | Zr | Ba | 0.1 | 1.0 | performed |
| Example A-6 | $Li_{1.2}Zr_{1.9}Sr_{0.1}(PO_4)_3$ | Zr | Sr | 0.1 | 1.0 | performed |
| Example A-7 | $Li_{1.2}Hf_{1.9}(Ca_{0.5}Sr_{0.5})_{0.1}(PO_4)_3$ | Hf | Sr | 0.1 | 0.5 | performed |
| Example A-8 | $Li_{1.2}(Zr_{0.5}Hf_{0.5})_{1.9}(Ca_{0.5}Ba_{0.25}Sr_{0.25})_{0.1}(PO_4)_3$ | Zr, Hf | Ba, Sr | 0.1 | 0.5 | performed |
| Example A-9 | $Li_{1.4}Zr_{1.8}(Ca_{0.5}Ba_{0.5})_{0.2}(PO_4)_3$ | Zr | Ba | 0.2 | 0.5 | performed |
| Example A-10 | $Li_2Zr_{1.5}(Ca_{0.5}Ba_{0.5})_{0.5}(PO_4)_3$ | Zr | Ba | 0.5 | 0.5 | performed |
| Example A-11 | $Li_3Zr_{1.0}(Ca_{0.5}Ba_{0.5})(PO_4)_3$ | Zr | Ba | 1.0 | 0.5 | performed |
| Example A-12 | $Li_4Zr_{0.5}(Ca_{0.5}Ba_{0.5})_{1.5}(PO_4)_3$ | Zr | Ba | 1.5 | 0.5 | performed |
| Example A-13 | $Li_{4.8}Zr_{0.1}(Ca_{0.5}Ba_{0.5})_{1.9}(PO_4)_3$ | Zr | Ba | 1.9 | 0.5 | performed |
| Example A-14 | $Li_{1.2}Zr_{1.9}(Ca_{0.5}Ba_{0.5})_{0.1}(PO_4)_3$ | Zr | Ba | 0.1 | 0.5 | not performed |
| Example A-15 | $Li_{1.2}Hf_{1.9}(Ca_{0.5}Sr_{0.5})_{0.1}(PO_4)_3$ | Hf | Sr | 0.1 | 0.5 | not performed |

In addition, Table 2 below summarizes raw materials (sources of constituent elements) used in the synthesis of the solid electrolytes in Examples A-1 to A-15 and Comparative Example A-1, and mixing ratios thereof.

TABLE 2

| Series | Li source/ amount | M1 source/ amount | Ca source/ amount | M2 source/ amount | $PO_4$ source/ amount |
|---|---|---|---|---|---|
| Comparative Example A-1 | $Li_2CO_3$/0.6 | $ZrO_2$/1.9 | $CaCO_3$/0.1 | — | $NH_4H_2PO_4$/3.0 |
| Example A-1 | $Li_2CO_3$/0.6 | $ZrO_2$/1.9 | $CaCO_3$/0.095 | $BaCO_3$/0.005 | $NH_4H_2PO_4$/3.0 |
| Example A-2 | $Li_2CO_3$/0.6 | $ZrO_2$/1.9 | $CaCO_3$/0.08 | $BaCO_3$/0.02 | $NH_4H_2PO_4$/3.0 |

TABLE 2-continued

| Series | Li source/ amount | M1 source/ amount | Ca source/ amount | M2 source/ amount | PO4 source/ amount |
|---|---|---|---|---|---|
| Example A-3 | $Li_2CO_3$/0.6 | $ZrO_2$/1.9 | $CaCO_3$/0.05 | $BaCO_3$/0.05 | $NH_4H_2PO_4$/3.0 |
| Example A-4 | $Li_2CO_3$/0.6 | $ZrO_2$/1.9 | $CaCO_3$/0.005 | $BaCO_3$/0.095 | $NH_4H_2PO_4$/3.0 |
| Example A-5 | $Li_2CO_3$/0.6 | $ZrO_2$/1.9 | — | $BaCO_3$/0.1 | $NH_4H_2PO_4$/3.0 |
| Example A-6 | $Li_2CO_3$/0.6 | $ZrO_2$/1.9 | — | $SrCO_3$/0.1 | $NH_4H_2PO_4$/3.0 |
| Example A-7 | $Li_2CO_3$/0.6 | $ZrO_2$/1.9 | $CaCO_3$/0.05 | $SrCO_3$/0.05 | $NH_4H_2PO_4$/3.0 |
| Example A-8 | $Li_2CO_3$/0.6 | $ZrO_2$/0.95, $HfO_2$/0.95 | $CaCO_3$/0.05 | $BaCO_3$/0.025, $SrCO_3$/0.025 | $NH_4H_2PO_4$/3.0 |
| Example A-9 | $Li_2CO_3$/0.7 | $ZrO_2$/1.8 | $CaCO_3$/0.1 | $BaCO_3$/0.1 | $NH_4H_2PO_4$/3.0 |
| Example A-10 | $Li_2CO_3$/1.0 | $ZrO_2$/1.5 | $CaCO_3$/0.25 | $BaCO_3$/0.25 | $NH_4H_2PO_4$/3.0 |
| Example A-11 | $Li_2CO_3$/1.5 | $ZrO_2$/1.0 | $CaCO_3$/0.5 | $BaCO_3$/0.5 | $NH_4H_2PO_4$/3.0 |
| Example A-12 | $Li_2CO_3$/2.0 | $ZrO_2$/0.5 | $CaCO_3$/0.75 | $BaCO_3$/0.75 | $NH_4H_2PO_4$/3.0 |
| Example A-13 | $Li_2CO_3$/2.4 | $ZrO_2$/0.1 | $CaCO_3$/0.95 | $BaCO_3$/0.95 | $NH_4H_2PO_4$/3.0 |
| Example A-14 | $Li_2CO_3$/0.6 | $ZrO_2$/1.9 | $CaCO_3$/0.05 | $BaCO_3$/0.05 | $NH_4H_2PO_4$/3.0 |
| Example A-15 | $Li_2CO_3$/0.6 | $HfO_2$/1.9 | $CaCO_3$/0.05 | $SrCO_3$/0.05 | $NH_4H_2PO_4$/3.0 |

(Li Ion Conductivity Measurement)

Next, in order to measure Li ion conductivities of the synthesized NASICON type solid electrolytes, the blocking electrodes manufactured by using the respective pellets were dried under vacuum at a temperature condition of 140° C. for 12 hours. Next, the blocking electrodes were each placed in four-terminal measurement vessel filled with dry argon (Ar). Each four-terminal measurement vessel with the blocking electrode was placed in a thermostat, and maintained at set temperatures for 2 hours, and then, impedance was measured by using an impedance analyzer 4192A manufactured by YOKOGAWA Hewlett-Packard. The set temperatures of the measurement were 25° C. and −30° C. A measurement frequency range was set to be from 5 Hz to 13 MHz, a resistance value of a bulk part was calculated from the measurement result of complex impedance, and the lithium ion conductivity $\sigma_b$ (S/cm) in the bulk part was calculated using an electrode area and thickness of the pellet.

(Powder X-Ray Diffraction Measurement)

Powder X-ray diffraction measurement was performed on the obtained samples as follows.

First, for the respective pellets of the solid electrolytes, after configuring the blocking electrodes and measuring the Li ion conductivities thereof, both surfaces of the pellets were polished by using a #800 wrapping film (manufactured by 3M) to scrape off the gold electrode completely. Then, the pellets from which the electrodes were scraped off were pulverized until an average particle diameter was about 10 μm, using the mortar and a pestle. Each pulverized sample was filled in a plate holder part having a depth of 0.2 mm formed on a glass sample plate. Subsequently, each sample was smoothed by sufficient pressing using another glass plate from the outside. Next, a glass plate filled with the sample was installed in a powder X-ray diffractometer, and diffraction patterns were obtained using a Cu-Kα Line.

As a result, it could be confirmed from the results of crystal structure analysis by the Rietveld method that the sample had the target NASICON type structure. For the Rietveld analysis of powder X-ray diffraction data, the lattice constant was refined. The obtained lattice constant (Å) was used to calculate a lattice volume V (Å$^3$), and the lattice volume was divided by a number of formula units per unit cell (Z) to obtain V/Z. Results thereof are shown in Table 3.

TABLE 3

| Series | Crystal phase | Space group of main phase | a (Å) | b (Å) | c (Å) | Conductivity $\sigma_b$ at 25° C. (S/cm) | Conductivity $\sigma_b$ at −10° C. (S/cm) |
|---|---|---|---|---|---|---|---|
| Comparative Example A-1 | rhombohedral | R-3c | 8.85 | = a | 22.05 | $5.1 \times 10^{-5}$ | $1.1 \times 10^{-7}$ |
| Example A-1 | rhombohedral | R-3c | 8.86 | = a | 22.12 | $9.4 \times 10^{-5}$ | $6.8 \times 10^{-7}$ |
| Example A-2 | rhombohedral | R-3c | 8.86 | = a | 22.14 | $2.2 \times 10^{-4}$ | $4.2 \times 10^{-6}$ |
| Example A-3 | rhombohedral | R-3c | 8.87 | = a | 22.14 | $4.1 \times 10^{-4}$ | $7.1 \times 10^{-6}$ |
| Example A-4 | rhombohedral | R-3c | 8.89 | = a | 22.18 | $3.5 \times 10^{-4}$ | $6.7 \times 10^{-6}$ |
| Example A-5 | rhombohedral | R-3c | 8.89 | = a | 22.21 | $3.2 \times 10^{-4}$ | $6.3 \times 10^{-6}$ |
| Example A-6 | rhombohedral | R-3c | 8.87 | = a | 22.16 | $2.7 \times 10^{-4}$ | $4.4 \times 10^{-6}$ |
| Example A-7 | rhombohedral | R-3c | 8.85 | = a | 22.13 | $1.5 \times 10^{-4}$ | $2.0 \times 10^{-6}$ |
| Example A-8 | rhombohedral | R-3c | 8.86 | = a | 22.13 | $1.0 \times 10^{-4}$ | $9.7 \times 10^{-7}$ |
| Example A-9 | rhombohedral | R-3c | 8.87 | = a | 22.15 | $2.8 \times 10^{-4}$ | $5.9 \times 10^{-6}$ |
| Example A-10 | rhombohedral | R-3c | 8.87 | = a | 22.17 | $2.4 \times 10^{-4}$ | $4.7 \times 10^{-6}$ |
| Example A-11 | rhombohedral + unknown | R-3c | 8.86 | = a | 22.14 | $7.5 \times 10^{-5}$ | $8.2 \times 10^{-7}$ |
| Example A-12 | rhombohedral + unknown | R-3c | 8.85 | = a | 22.09 | $6.9 \times 10^{-5}$ | $5.6 \times 10^{-7}$ |
| Example A-13 | monoclinic + unknown | C2/c | 15.32 | 8.83 | 22.13 | $6.3 \times 10^{-5}$ | $3.6 \times 10^{-7}$ |
| Example A-14 | rhombohedral + unknown | R-3c | 8.85 | = a | 22.08 | $5.9 \times 10^{-5}$ | $2.5 \times 10^{-7}$ |

TABLE 3-continued

| Series | Crystal phase | Space group of main phase | a (Å) | b (Å) | c (Å) | Conductivity $\sigma_b$ at 25° C. (S/cm) | Conductivity $\sigma_b$ at −10° C. (S/cm) |
|---|---|---|---|---|---|---|---|
| Example A-15 | rhombohedral + unknown | R-3c | 8.84 | = a | 22.06 | $5.5 \times 10^{-5}$ | $1.8 \times 10^{-7}$ |

It can be appreciated from the results of Table 3 that it is possible to obtain excellent conductivity at 25° C. in the compounds represented by General Formula $Li_{1+2x}M1_{2-x}(Ca_{1-y}M2_y)_x(PO_4)_3$, wherein M1 is at least one kind of element selected from Zr and Hf, M2 is at least one kind of element selected from Sr and Ba, x satisfies 0<x<2, and y satisfies 0<y≤1. In addition, it can be appreciated that conductivity at −10° C. was also good in the compounds.

2. Lithium Battery

In order to examine low-temperature discharge performance of the battery using the NASICON type solid electrolyte, a single stack electrode body composed of a positive electrode layer/electrolyte layer (composite electrolyte layer)/negative electrode layer shown in FIG. 2 was prepared. As a positive electrode active material, particles of $LiMn_{0.85}Fe_{0.1}Mg_{0.05}PO_4$ having an olivine structure in which primary particles had an average particle diameter of 50 nm, the primary particle having carbon fine particles (average particle diameter of 5 nm) adhered on a surface thereof (adhesion amount of 0.1 wt %), were used. The particles of the positive electrode active material, vapor grown carbon fibers having a fiber diameter of 0.1 μm as the conductive agent, graphite powder as the conductive agent, and PVdF as the binder were mixed at a weight ratio of 100:3:5:5, and dispersed in a n-methylpyrrolidone (NMP) solvent to prepare a slurry. Then, the obtained slurry was applied to one surface of an aluminum alloy foil (purity of 99%) having a thickness of 15 μm. The coated film of the slurry was dried and pressed to manufacture a positive electrode which included a positive electrode layer having a thickness of 67 μm formed on one surface of the current collector (aluminum alloy foil), wherein an electrode density was 2.2 g/cm³ (not including the current collector).

As the negative electrode active material, $Li_4Ti_5O_{12}$ particles in which an average particle diameter was $D_{50}$=0.8 μm, and a specific surface area was 10 m²/g were used in Example B-1. $Li_2Na_2Ti_6O_{14}$ particles in which an average particle diameter was $D_{50}$=0.6 μm, and a specific surface area was 15 m²/g were used in Example B-2. $Nb_2TiO_7$ particles in which an average particle diameter was $D_{50}$=1.0 μm, and a specific surface area was 8 m²/g were used in Example B-3. The respective negative electrode active material particles, graphite powder having an average particle diameter of 6 μm as the conductive agent, and PVdF as the binder were mixed at a weight ratio of 95:3:2, and dispersed in n-methylpyrrolidone (NMP) solution, then stirred using a ball mill under conditions in which the number of revolutions was 1000 rpm and a stirring time was 2 hours, thereby preparing a slurry. The obtained slurry was applied to an aluminum alloy foil (purity of 99.3%) having a thickness of 15 μm. A coated film of the slurry was dried, followed by a hot pressing process, thereby manufacturing a negative electrode. Accordingly, the negative electrode which included a negative electrode layer having a thickness of about 59 μm formed on one surface of the current collector (aluminum alloy foil), wherein an electrode density was 2.2 g/cm³ (not including the current collector), was manufactured. Porosity of the negative electrode excluding the current collector was approximately 35%.

A composite electrolyte used for the electrolyte layer was prepared as follows. First, the solid electrolyte particles synthesized in Example A-1 were pulverized until the primary particle size (diameter) was 1 μm. The pulverized solid electrolyte particles in a predetermined amount were mixed in a gel-like polyacrylonitrile polymer that contained a mixed solvent including propylene carbonate (PC) and diethyl carbonate (DEC) (volume ratio of 1:2) with 1.2 M $LiPF_6$ dissolved therein, in order to obtain a composite, thereby manufacturing an electrolyte layer of a composite electrolyte having a thickness of 2 μm between the positive electrode layer of the respective positive electrodes obtained as described above and the negative electrode layer of the respective negative electrodes obtained as described above. Here, the weight ratio of the solid electrolyte particles, the PC/DEC mixed solvent, and the gel-like polyacrylonitrile polymer was 96:3.2:0.8.

More specifically, in obtaining the composite electrolyte, the solid electrolyte particles synthesized in Example A-1 were first dispersed in a PVdF binder solution dissolved in a n-methylpyrrolidone (NMP) solution before gelling, and the obtained dispersion solution was applied on the positive electrode layer and the negative electrode layer. The dispersion solution was dried, and a solution including PC/DEC mixed solvent (volume ratio 1:2) with 1.2 M $LiPF_6$ dissolved therein, and including polyacrylonitrile (PAN) polymer (2 mass %), and further including 2,2'-azobis-4-methoxy-2,4-dimethylvaleronitrile added as a radical initiator for initiating polymerization, was impregnated into each of the electrode layers and the binder thereon, followed by heating, thereby preparing a gelled composite electrolyte. Here, organic components in the electrode layers and the composite electrolyte were adjusted to be 3% and 4% by weight, respectively. In addition, a weight ratio of inorganic particles, the binder, and the organic components in the composite electrolyte was 94.3:1.9:3.8. A weight ratio of the organic electrolyte (PC/DEC solution of $LiPF_6$) in the composite electrolyte was 3.0%. The manufactured single stack lithium batteries (all solid batteries) were designated as Examples B-1 to B-3 according to the negative electrode active materials used as described above. Then, a single stack lithium battery (all solid battery) was manufactured in the same manner as in the above-described method except that the solid electrolyte particles synthesized in Comparative Example A-1 were used, and the manufactured single stack lithium battery was designated as Comparative Example B-1.

(Charge and Discharge Measurement)

The lithium batteries manufactured in Examples B-1 to B-3 and Comparative Example B-1 were subjected to a charge and discharge test under environments of 25° C., −10° C., and −30° C. With regard to Example B-1, Comparative Example B-1, and Example B-3 using $Li_4Ti_5O_{12}$ or $Nb_2TiO_7$ as the negative electrode active material, a charge and discharge range in the charge and discharge test was set to a potential range of 1.0 V to 1.7 V (vs. Li/Li$^+$). With regard to Example B-2 using $Li_2Na_2Ti_6O_{14}$ as the negative electrode active material, the charge and discharge range was set to a potential range of 1.0 V to 3.0 V (vs. Li/Li$^+$). When examining the capacity, the charge and discharge was performed with a charge and discharge current value set to be 0.01 C (hourly discharge rate) at a temperature condition of 25° C., and a discharge capacity at this time was set as a reference capacity (100%). Then, the charge and discharge was performed at a temperature condition of 25° C., −10° C., and −30° C., each at 0.1 C, and a discharge capacity retention ratio with respect to the reference capacity was calculated. In addition, the respective lithium batteries were subjected to the charge and discharge at a temperature condition of −30° C. at 1.0 C, and the discharge capacity retention ratio with respect to the reference capacity was calculated.

Configurations of the electrode bodies of the lithium batteries manufactured in Examples B-1 to B-3 and Comparative Example B-1, and results of the charge and discharge tests are shown in Table 4 below.

charge performance and low-temperature rate performance can be obtained by using the solid electrolyte according to the embodiment.

According to at least one embodiment and Examples as described above, a solid electrolyte is provided. The solid electrolyte includes an oxide represented by General Formula $Li_{1+2x}M1_{2-x}(Ca_{1-y}M2_y)_x(PO_4)_3$. In the General Formula, M1 is at least one selected from the group consisting of Zr and Hf. M2 is at least one selected from the group consisting of Sr and Ba. x satisfies 0<x<2. y satisfies 0<y≤1. According to the above-described composition, it is possible to provide a solid electrolyte having chemical stability of constituent elements and high lithium ion conductivity at a temperature lower than room temperature while requiring low cost, a lithium battery having excellent discharge rate performance at a low temperature, a battery pack including the lithium battery, and a vehicle including the battery pack.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in

TABLE 4

| Series | Configuration of electrode body Positive electrode active material in positive electrode layer/ Solid electrolyte in composite electrolyte/ Negative electrode active material in negative electrode layer | 0.01 C discharge capacity at 25° C. (%) | 0.1 C discharge capacity retention ratio at 25° C. (%) | 0.1 C discharge capacity retention ratio at −10° C. (%) | 0.1 C discharge capacity retention ratio at −30° C. (%) | 1.0 C discharge capacity retention ratio at −30° C. (%) |
|---|---|---|---|---|---|---|
| Comparative Example B-1 | $LiMn_{0.85}Fe_{0.1}Mg_{0.05}PO_4$/ $Li_{1.2}Zr_{1.9}Ca_{0.1}(PO_4)_3$/ $Li_4Ti_5O_{12}$ | 100 | 91.8 | 73.4 | 25.1 | unable to discharge |
| Example B-1 | $LiMn_{0.85}Fe_{0.1}Mg_{0.05}PO_4$/ $Li_{1.2}Zr_{1.9}(Ca_{0.95}Ba_{0.05})_{0.1}(PO_4)_3$/ $Li_4Ti_5O_{12}$ | 100 | 98.2 | 93.2 | 68.5 | 28.3 |
| Example B-2 | $LiMn_{0.85}Fe_{0.1}Mg_{0.05}PO_4$/ $Li_{1.2}Zr_{1.9}(Ca_{0.95}Ba_{0.05})_{0.1}(PO_4)_3$/ $Li_2Na_2Ti_6O_{14}$ | 100 | 96.5 | 92.7 | 63.8 | 30.2 |
| Example B-3 | $LiMn_{0.85}Fe_{0.1}Mg_{0.05}PO_4$/ $Li_{1.2}Zr_{1.9}(Ca_{0.95}Ba_{0.05})_{0.1}(PO_4)_3$/ $Nb_2TiO_7$ | 100 | 96.2 | 92.2 | 64.2 | 27.4 |

As shown in Table 4, the lithium batteries manufactured in Examples B-1 to B-3 exhibited a discharge capacity retention ratio with respect to the reference capacity (at the 0.01 C rate discharge at 25° C.) of 90% or more in the discharge at 0.1 C rate under the temperature conditions of 25° C. and −10° C. In addition, in the discharges at 0.1 C and 1.0 C rate under the temperature condition of −30° C., the discharge capacity retention ratio was 60% or more and 25% or more, respectively, with respect to the reference capacity.

On the other hand, the lithium battery manufactured in Comparative Example B-1 exhibited the discharge capacity retention ratio of 90% or more at 0.1 C rate discharge under the temperature condition of 25° C. However, the discharge capacity retention ratio was remarkably lowered under a low temperature condition of −10° C. or −30° C. In addition, in Comparative Example B-1, the lithium battery could not be discharged at the temperature condition of −30° C. at 1.0 C rate.

It can be appreciated from the above-described results that the lithium battery having excellent low-temperature disthe form of the embodiment described herein may be made without departing from the spirit of the invention. The accompanying claims and their equivalents are intended to cover such embodiments or modifications as would fall within the scope and spirit of the inventions.

What is claimed is:
1. A solid electrolyte comprising:
an oxide of formula $Li_{1+2x}M1_{2-x}(Ca_{1-y}M2_y)_x(PO_4)_3$,
wherein M1 is at least one selected from the group consisting of Zr and Hf, M2 is at least one selected from the group consisting of Sr and Ba, x satisfies 0.1≤x≤0.5, and y satisfies 0.05≤y≤1,
wherein the oxide comprises a crystal structure of a rhombohedral structure, and lattice constants of the crystal structure satisfy 8.85 Å≤a≤8.89 Å and 22.13 Å≤c≤22.21 Å.
2. A lithium battery comprising:
a positive electrode layer capable of having lithium ions inserted and extracted;
a negative electrode layer capable of having lithium ions inserted and extracted; and a Li conductive layer capable of conducting lithium ions, wherein at least one of the positive electrode layer, the negative electrode layer, and the Li conductive layer comprises the solid electrolyte according to claim 1.

3. The lithium battery according to claim 2, wherein the positive electrode layer comprises a positive electrode active material particle and a polymer material layer, the polymer material layer covering at least a portion of a surface of the positive electrode active material particle and comprising the solid electrolyte.

4. The lithium battery according to claim 2, wherein at least one of the positive electrode layer, the negative electrode layer, and the Li conductive layer comprises a composite electrolyte, the composite electrolyte comprising the solid electrolyte and an organic electrolyte, a weight ratio of the organic electrolyte in the composite electrolyte being from 0.1% to 20%.

5. The lithium battery according to claim 2, wherein the Li conductive layer is interposed between the positive electrode layer and the negative electrode layer.

6. The lithium battery according to claim 2, further comprising plural stacks and a current collector, each of the plural stacks comprising the positive electrode layer, the Li conductive layer, and the negative electrode layer sequentially stacked in this order, wherein the lithium battery comprises a bipolar electrode structure in which the current collector is arranged between the positive electrode layer of one of the stacks and the negative electrode layer of another of the stacks.

7. The lithium battery according to claim 2, wherein the negative electrode layer comprises a negative electrode active material comprising a niobium-titanium composite oxide represented by $Li_aTiM_bNb_{2\pm\beta}O_{7\pm\sigma}$, where $0<a<5$, $0<b<0.3$, $0<\beta<0.3$, $0<\sigma<0.3$, and M is at least one selected from the group consisting of Fe, V, Mo, and Ta.

8. The lithium battery according to claim 2, wherein the negative electrode layer comprises a negative electrode active material comprising a titanium composite oxide of formula $Li_{2+a}M(I)_{2-b}Ti_{6-c}M(II)_dO_{14+\sigma}$, where M(I) is Na or includes Na and at least one selected from the group consisting of Sr, Ba, Ca, Mg, Cs, and K, M(II) is at least one selected from the group consisting of Zr, Sn, V, Nb, Ta, Mo, W, Fe, Co, Mn, and Al, a satisfies $0 \le a \le 6$, b satisfies $0 \le b < 2$, c satisfies $0 < c < 6$, d satisfies $0 \le d < 6$, and σ satisfies $-0.5 \le \sigma \le 0.5$.

9. A battery pack comprising the lithium battery according to claim 2.

10. The battery pack according to claim 9, further comprising:
an external power distribution terminal; and
a protective circuit.

11. The battery pack according to claim 9, comprising a plurality of the lithium batteries, the lithium batteries being electrically connected in series, in parallel, or in a combination of in series and in parallel.

12. A vehicle comprising the battery pack according to claim 9.

13. The vehicle according to claim 12, wherein the battery pack is configured to recover a regenerative energy of power of the vehicle.

14. The solid electrolyte according to claim 1, which has a lithium ion conductivity at −10° C. of $1.8 \times 10^{-7}$ S/cm or more.

* * * * *